(12) United States Patent
Bossmann et al.

(10) Patent No.: US 12,534,440 B2
(45) Date of Patent: Jan. 27, 2026

(54) COMPOUNDS WITH COPPER- OR ZINC-ACTIVATED TOXICITY AGAINST MICROBIAL INFECTION

(71) Applicants: Kansas State University Research Foundation, Manhattan, KS (US); The UAB Research Foundation, Birmingham, AL (US)

(72) Inventors: Stefan H. Bossmann, Manhattan, KS (US); Madumali Kalubowilage, Manhattan, KS (US); Man Zhang, Cohoes, NY (US); Anjana Delpe-Acharige, Manhattan, KS (US); Kayla Eschliman, Manhattan, KS (US); Frank Wolschendorf, Birmingham, AL (US); Olaf Kutsch, Birmingham, AL (US); Alex Dalecki, Birmingham, AL (US); Whitney Narmore, Birmingham, AL (US)

(73) Assignees: Kansas State University Research Foundation, Manhattan, KS (US); The UAB Research Foundation, Birmingham, AL (US)

( * ) Notice: Subject to any disclaimer, the term of this patent is extended or adjusted under 35 U.S.C. 154(b) by 1224 days.

(21) Appl. No.: 17/277,631

(22) PCT Filed: Sep. 20, 2019

(86) PCT No.: PCT/US2019/052087
§ 371 (c)(1),
(2) Date: Mar. 18, 2021

(87) PCT Pub. No.: WO2020/061412
PCT Pub. Date: Mar. 26, 2020

(65) Prior Publication Data
US 2022/0024877 A1    Jan. 27, 2022

Related U.S. Application Data

(60) Provisional application No. 62/734,030, filed on Sep. 20, 2018.

(51) Int. Cl.
| | |
|---|---|
| *C07D 231/42* | (2006.01) |
| *A61K 45/06* | (2006.01) |
| *A61P 31/04* | (2006.01) |
| *C07D 231/22* | (2006.01) |

(52) U.S. Cl.
CPC ............ *C07D 231/42* (2013.01); *A61K 45/06* (2013.01); *A61P 31/04* (2018.01); *C07D 231/22* (2013.01)

(58) Field of Classification Search
CPC .... C07D 231/42; C07D 231/22; A61K 45/06; A61K 31/415; A61P 31/04; A61P 31/00
See application file for complete search history.

(56) References Cited

U.S. PATENT DOCUMENTS

| | | |
|---|---|---|
| 7,700,786 B2 | 4/2010 | Hirai et al. |
| 9,451,775 B2 | 9/2016 | Bretschneider et al. |
| 2009/0110751 A1 | 4/2009 | Kenneke |
| 2013/0324598 A1 | 12/2013 | Kutsch et al. |

OTHER PUBLICATIONS

STN (Registry No. 1017685-64-1, Entered Apr. 28, 2008 (Year: 2008).*
Besold, J. Biol. Inorg. Chem., 2016, 21:137-144 (Year: 2016).*
Ahmed, Oncoimmunology, 2018, vol. 7, No. 11, p. e1507670-2 (Year: 2018).*
Sadr, Journal of Organometallic Chemistry, 2005, 690, 2128-2132 (Year: 2005).*
Kapoor (J. Heterocyclic Chem., 55, 899 (2018)). (Year: 2018).*
Sadr, Transition Met. Chem., 2012, 37:611-617 (Year: 2012).*
Evans, Inorganica Chimica Acta, 357, 2004, 4528-4536 (Year: 2004).*
International Search Report and Written Opinion in corresponding PCT/US2019/052087, dated Dec. 2, 2019.
Dalecki, et al., "Combinatorial phenotypic screen uncovers unrecognized family of extended thiourea inhibitors with copper-dependent anti-staphylococcal activity", Metallomics, 8(4), Apr. 2016, pp. 412-421.
Faraldo-Gomez, et al., "Acquisition of Siderophores in Gram-Negative Bacteria", Nature Reviews, 4, Feb. 2003, pp. 105-116.
Sun, et al., "Bacterial multidrug efflux pumps: Mechanisms, physiology and pharmacological exploitations", Biochemical and Biophysical Research Communications, 453, May 2014, pp. 254-267.
Besold, et al., "The Yin and Yang of copper during infection", J Biol Inorg Chem, 21, Jan. 2016, pp. 137-144.
Diederen, et al., "In Vitro Activity of Daptomycin against Methicillin-Resistant *Staphylococcus aureus*, Including Heterogeneously Glycopeptide-Resistant Strains", Antimicrobial Agents and Chemotherapy, Sep. 2006, 50(9), pp. 3189-3191.
Djoko, et al., "Copper and zinc toxicity and its role in innate immune defense against bacterial pathogens", JBC Papers in Press, Jun. 8, 2015, available at: http://www.jbc.org/cgi/doi/10.1074/jbc.R115.647099.
Tauber, et al., "Radical Addition to Iminium Ions and Cationic Heterocycles", Molecules, 2014, 19, pp. 16190-16222.
Volzing, et al., "Antimicrobial Peptides Targeting Gram-negative Pathogens, Produced and Delivered by Lactic Acid Bacteria", ACS Synth Biol., Nov. 15, 2013, 2(11), pp. 643-650.
Mccloskey, et al., "Potential strategies for the eradication of multidrug resistant Gram-negative bacterial infections", Future Microbiology, Jun. 30, 2016, 11(7), pp. 955-972.

(Continued)

*Primary Examiner* — Susanna Moore
*Assistant Examiner* — Luisalberto Gonzalez
(74) *Attorney, Agent, or Firm* — Hovey Williams LLP; Crissa A. Cook

(57) ABSTRACT

Heterocyclic compounds with a novel pyrazole thioamide-based NNSN structural motif, having highly effective zinc- or copper-activated toxicity against microbial infections at micromolar or nanomolar minimum inhibitory concentrations (MIC), and methods of making and using the same.

26 Claims, 5 Drawing Sheets

Specification includes a Sequence Listing.

(56) References Cited

OTHER PUBLICATIONS

Speer, et al., "Copper-Boosting Compounds: a Novel Concept for Antimycobacterial Drug Discovery", Antimicrobial Agents and Chemotherapy, Feb. 2013, 57(2), pp. 1089-1091.
Bandyopadhyay, et al., "Targeting biomolecules with reversible covalent chemistry", Current Opinion in Chemical Biology, 2016, 34, pp. 110-116.

* cited by examiner

COMPOUNDS WITH COPPER- OR ZINC-ACTIVATED TOXICITY AGAINST MICROBIAL INFECTION

CROSS-REFERENCE TO RELATED APPLICATIONS

The present application is the U.S. National Stage of International Patent Application No. PCT/US2019/052087, filed Sep. 20, 2019, which claims the priority benefit of U.S. Provisional Patent Application Ser. No. 62/734,030, filed Sep. 20, 2018, entitled COMPOUNDS WITH COPPER-OR ZINC-ACTIVATED TOXICITY AGAINST MICROBIAL INFECTION, each of which is incorporated by reference in its entirety herein.

FEDERALLY SPONSORED RESEARCH OR DEVELOPMENT

This invention was made with government support under Grant No. 1R01AI121364-01A1 awarded by the National Institutes of Health. The government has certain rights in the invention.

SEQUENCE LISTING

The following application contains a sequence listing in computer readable format (CRF), submitted as a text file in ASCII format entitled "Sequence_Listing," created on Sep. 18, 2019, as 1 KB. The content of the CRF is hereby incorporated by reference herein.

BACKGROUND OF THE INVENTION

Field of the Invention

The present invention relates to copper- or zinc-activated compounds for inhibiting microbial infections.

Description of Related Art

Antibiotic resistance has become a worldwide health concern. A steadily increasing number of resistant bacteria endanger the efficacy of antibiotic drugs that are available on the market and lead to the critical need for developing new drug candidates. Current antibiotics against multi-drug resistant Gram-positive bacteria have minimum inhibitory concentrations (MICs) ranging from 0.8 µM to 2.2 µM: Vancomycin (2.2 µM), Teicoplanin (0.8-1.0 µM), and Daptinomycin (0.6 µM). Yet, bacteria continue to develop effective resistance mechanisms against such drugs and/or higher dosages are necessary to achieve therapeutic effect.

Nutritional immunity and metal-mediated immunity have emerged as aspects of the innate immune system worth studying, where key nutrients are withheld from invading pathogens while toxic metal ions are increased. Studies have shown that in bacteria-infected cells, iron and other nutrients are withheld from the phagosomes and in which the bacteria are taken up, while other minerals, such as zinc and copper (I) are increased. Cu ions may also be harnessed directly by phagocytes as an antibacterial agent. Copper I/II facilitates Fenton-type biochemistry at the low pH in phagolysosomes (phagosomes after fusing with lysosomes), which is able to damage the bacterial membranes, thus facilitating enhanced drug uptake. Inside bacteria, copper I/II is capable of destroying Fe—S clusters, inactivating various essential bacterial enzymes using Fe—S clusters as cofactors. Similarly, there is evidence that zinc exerts an antimicrobial effect by antagonizing the uptake of other key trace metal nutrients. In response to bacterial and/or fungal infection, studies have shown that zinc is released within innate immune cells, such as neutrophils and free zinc levels are elevated during infection. The antibiotic activity of these minerals is further supported by the data that shows that microorganisms have developed several strategies against nutritional immunity, including copper and zinc efflux pumps, which have been identified in mycobacteria, Gram-negative bacteria, and Gram-positive bacteria.

SUMMARY OF THE INVENTION

Described herein are heterocyclic compounds with a novel pyrazole thioamide-based NNSN structural motif, which show highly effective zinc- or copper-activated toxicity against microbial infection at micromolar or nanomolar minimum inhibitory concentrations (MIC).

As an antimicrobial, zinc and/or copper affect numerous sites within a cell, and specific targets affected by copper and zinc have been identified for many microorganisms. The multi-faceted potential activity of these novel copper- or zinc-dependent inhibitors offers an alternative to conventional bacterial resistance mechanisms: since multiple individual targets could be vulnerable, development of resistance would be much more difficult than against traditional, single target antibiotics. Unfortunately, free ions have little therapeutic value due to their erratic reactivity. Though therapeutically infeasible on its own, copper and/or zinc's potential can be exploited through combination with the inventive small organic molecules, offering a promising new approach to overcome microbial drug resistance.

The novel compounds upon administration react with endogenous $Cu^{2+}$ or $Zn^{2+}$ that has accumulated at sites of infection. Copper(I)-activation of the compounds leads to the formation of an iminium-type cation. Iminium cations are potent warheads because they react with multiple targets through nucleophilic addition, electron transfer, and radical reactions. In short, they cause havoc in the bacteria by impairing numerous enzymes at once. Further, because these compounds are only activated in the presence of copper (found in elevated concentrations at sites of infection), they otherwise remain inactive and inert until they reach the target site of infection in the patient or encounter copper in sufficient concentrations. A similar mechanism is achieved in the presence of zinc. This approach allows for more directed/targeted and local treatment, and can avoid systemic reactions, toxicity, and the like. Further, because of this targeted approach, lower concentrations of the compounds may be needed to achieve the therapeutic outcome, as compared to traditional antibiotics. In addition, since commensal bacterial population are not targeted by these compounds, resistance is less likely to develop and/or spread, which may positively impact the clinical half-life of these compounds compared to many traditional antibiotics.

The present invention is broadly concerned with compounds having a structure according to I, which includes a novel pyrazole-thioamide based NNSN motif:

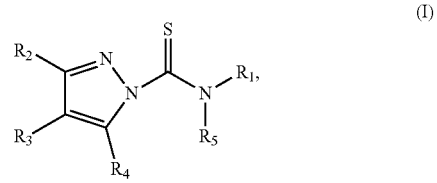

(I)

wherein the biophysical properties of the compound are highly tunable by manipulating the substituents selected for each of the R groups. For example, work herein demonstrates that when $R_1$ is a phenyl group, using a halogen substitution at the 2-position of the aromatic moiety increases the activity ten-fold (MIC 0.6 μM), compared to when it's included at the 4-position (MIC 5 μM). Further, work herein demonstrates that amino-substitution of the pyridazole ring in the 3-position significantly increases the activity as well.

Further, the compounds can be coupled with targeting peptides, labels, tags, and the like. An example demonstrating coupling of the compound with a targeting peptide:

SEQ ID NO: 3

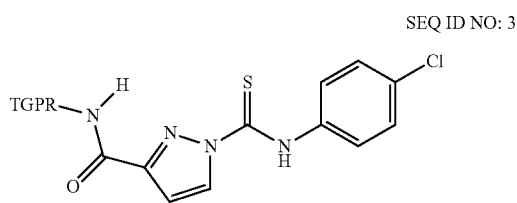

Additional examples include peptide sequences for targeting Gram-negative bacteria, such as A3APO (SEQ ID NO:1) and Alyteserin (SEQ ID NO:2), which are able to penetrate the outer membrane of Gram-negative bacteria. Further targeting moieties that could be attached to the compounds include siderophores of Gram-negative bacteria (e.g. Enterobactin or Ferrichrome), and/or siderophores of Mycobacteria (Mycobactins), which bind iron and are actively taken up by the bacteria to counteract nutritional immunity. This further facilitates not just targeting, but uptake of the compounds by the bacterium, where the warhead will become active.

Hypoxia-activated embodiments are also envisioned:

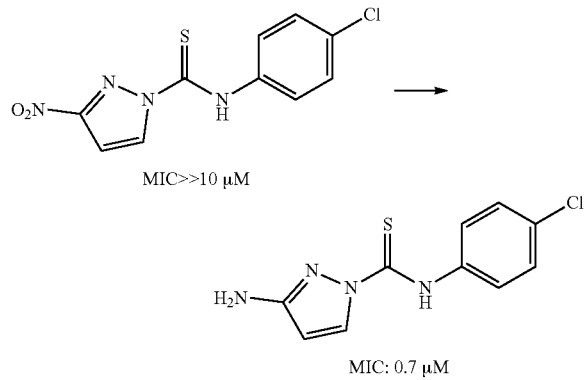

Bis-NNSN versions of this core compound have also been developed:

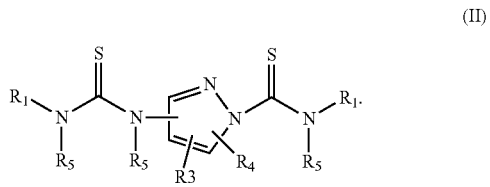

In certain embodiments, the Bis-NNSN version has an IC50 of <100 nM, which is unprecedented.

A method of inhibiting (treating or preventing) microbial infection in a subject is also provided. The method comprises administering to the subject a therapeutically-effective amount of a compound according to the various embodiments described herein.

A broad spectrum antibiotic composition is also disclosed. The composition comprises a compound according to the various embodiments described herein dispersed in a pharmaceutically-acceptable carrier.

A kit is also provided herein. The kit comprises: a compound according to the various embodiments described herein; and instructions for administering the compound to a subject in need thereof.

A method of inhibiting replication of bacteria in a cell is also disclosed. The method comprises contacting the cell with a compound according to the various embodiments described herein, wherein the bacteria is selected from mycobacteria, Gram-negative bacteria, and/or Gram-positive bacteria.

The invention is also concerned with the use of a compound according to the various embodiments described herein to prepare a therapeutic or prophylactic medicament for the inhibition of a bacterial infection in a subject.

DETAILED DESCRIPTION

Figure 1:
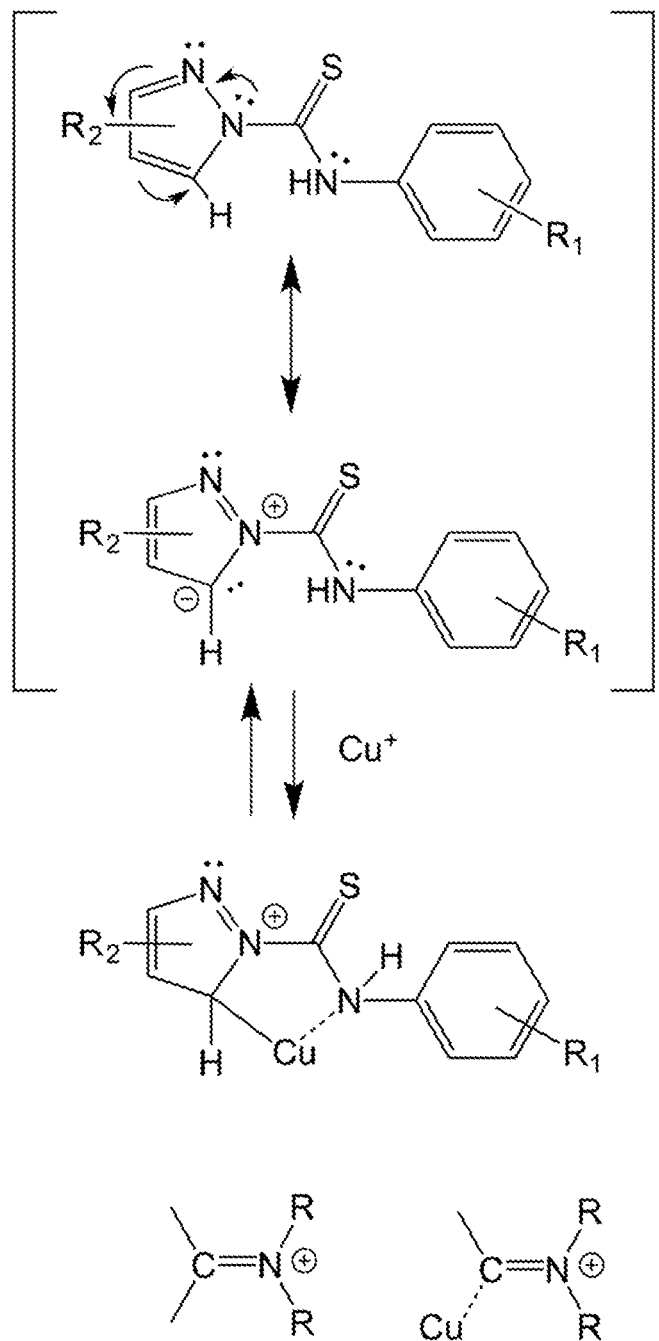
FIG. 1 depicts a mechanism of copper(I) complexation leading to the formation of a copper-analog of an iminium cation.

Prior work identified several thiourea compounds with NNSN-motif that exhibit weak copper(I)-binding capabilities. Therefore, they are only active in phagosomes and phagolysosomes where up to 10-100 μg $L^{-1}$ copper is provided, and provide little practical utility. Upon complexation with copper(I), an iminium cation is formed, which is a well-known reactive intermediate in numerous organic reactions. It is our paradigm that this reactive group is capable of acting as a warhead and/or can facilitate DNA-intercalation.

Accordingly, we have developed novel, previously undiscovered, antimicrobial compounds comprising a pyrazole-thioamide based NNSN motif.

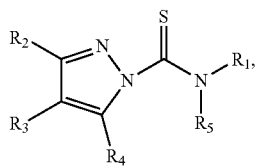

(I)

where $R_1$ and $R_5$ are each independently selected from the group consisting of hydrogen, substituted and unsubstituted aryls, arylalkyls (e.g. benzyl), branched or unbranched alkyls (preferably $C_1$-$C_{10}$, e.g., methyl, ethyl, butyl, isobutyl, etc.) or alkenyls (preferably $C_2$-$C_{10}$, e.g., vinyl, butenyl, isobutenyl, etc.), or oligoglycols (n=2-6 glycol units), or any member of the $C_5$- and $C_6$-sugars, cycloalkyls (preferably $C_3$-$C_{12}$, e.g., cyclohexylmethyl), heterocycles (e.g., benzothiozole, dihydrofuran, dioxane, furan, morpholine, oxazole, imidazome, pyridine, pyrimidine, pyrazine, pyrazine, pyrazole, pyrrolidine, piperidine, pyran, tetrazole, tetrahydrofuran, thiophene, thiazole, etc.), (substituted) amines, amides, or combinations thereof (e.g., halogen-substituted aryl connected via alkyl chain), and the like; $R_2$ is selected from the group consisting of hydrogen, branched or unbranched alkyls (preferably $C_1$-$C_{10}$, e.g., methyl, ethyl, butyl, isobutyl, etc.) or alkenyls (preferably $C_2$-$C_{10}$, e.g., vinyl, butenyl, isobutenyl, etc.), amino groups, substituted or unsubstituted amines (e.g., dimethylamine), substituted or unsubstituted amides (e.g., sulfonamides, peptides), ethers, thioethers, esters, carboxylic acids, esters, substituted and unsubstituted aryls, thiourea groups, combinations thereof (e.g., aryl connected via ether linkage or thiourea linkage); $R_3$ and $R_4$ are each independently selected from the group consisting of hydrogen, halogens, branched or unbranched alkyls (preferably $C_1$-$C_{10}$, e.g., methyl, ethyl, butyl, isobutyl, etc.) or alkenyls (preferably $C_2$-$C_{10}$, e.g., vinyl, butenyl, isobutenyl, etc.), cycloalkyls (preferably $C_3$-$C_{12}$, e.g., cyclohexylmethyl), heterocycles (e.g., benzothiozole, dihydrofuran, dioxane, furan, morpholine, oxazole, imidazome, pyridine, pyrimidine, pyrazine, pyrazine, pyrazole, pyrrolidine, piperidine, pyran, tetrazole, tetrahydrofuran, thiophene, thiazole, etc.), ethers, thioethers, esters, (substituted) amines, amides, hydrazines, hydrazones, nitro groups, combinations thereof, and the like. Each of the above-mentioned branched or unbranched alkyls or alkenyls may be halogen-, sulfonic acid-, or nitro-substituted. Exemplary aryls include phenyls and benzyls, which may be substituted by one or more halogens (—Cl, Br, F, etc.), nitro groups, alkoxies (e.g., methoxy), or alkyls (preferably $C_1$-$C_{10}$). In one or more embodiments, $R_1$ is preferably a halogen-substituted aryl, and preferably a halogen-substituted phenyl or benzyl group. In one or more embodiments, $R_2$ is preferably an amino moiety, and preferably a primary amine group, such as —$NH_2$. In one or more embodiments, $R_2$ is preferably a benzyloxy moiety. In one or more embodiments, each of $R_3$, $R_4$, and $R_5$ are hydrogen.

In one or more embodiments, the compounds comprise a bis-NNSN motif:

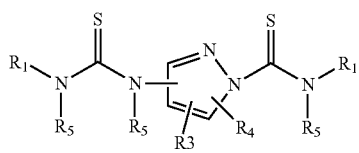

(II)

or a "pharmaceutically-acceptable salt" thereof, where each $R_1$, $R_3$, $R_4$, and $R_5$ are each independently defined as above. In one or more embodiments, each $R_1$ is preferably a halogen-substituted aryl, and preferably a halogen-substituted phenyl or benzyl group (e.g., Cl-substituted phenyl). In one or more embodiments, each of $R_3$ and $R_4$ is hydrogen. In one or more embodiments, each $R_5$ is either hydrogen or an alkyl (-methyl).

In each of compounds I and II, further substitutions can be envisioned. For example, the sulfur group could be modified, protected, or substituted. Pharmaceutically-acceptable salts of such compounds could also be used. The term "pharmaceutically-acceptable salt," as used herein, refers to an acid or base salt of a compound of the invention (e.g., HCl, acetate, HBr, etc.), which salt possesses the desired antimicrobial activity and is neither biologically nor otherwise undesirable. Combinations of one or more of the foregoing compounds can also be used in the invention.

The MICs of the inventive pyrazole thioamide compounds are in the lower micromolar or submicromolar range and therefore comparable with the MICs of antibiotics frequently used to treat susceptible resistant bacteria infections. Further, bis-NNSN compounds increase the efficacy to the low nanomolar range. This is unprecedented.

These compounds have broad-spectrum activity against multiple bacteria, including mycobacteria, Gram-negative bacteria, and/or Gram-positive bacteria, as well as fungal infections. In some embodiments, antimicrobial compounds comprising (consisting essentially or even consisting of) formula (I) or formula (II), or the pharmaceutically-acceptable salt thereof, are provided. In some embodiments, the compounds are selected from the group consisting of compounds in Table I, or a pharmaceutically-acceptable salt thereof. Particularly preferred compounds showing the best activity against Gram-positive *Staphylococcus aureus*, particularly Newman and clinically isolated methicillin resistance strains, are selected from the group consisting of:

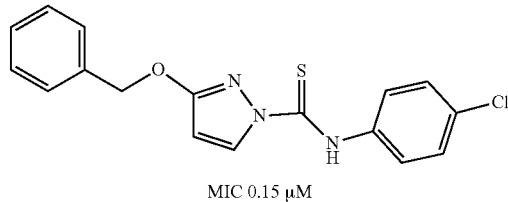

SB44

MIC 0.15 μM

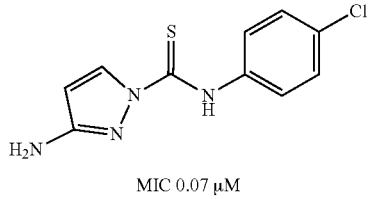

APM 03

MIC 0.07 μM

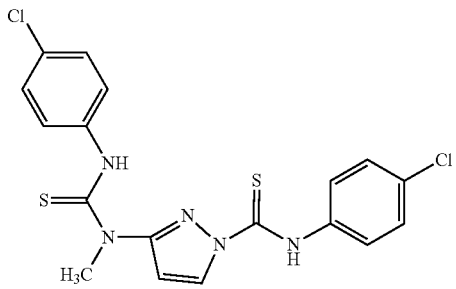

SB45

MIC = < 16 nM

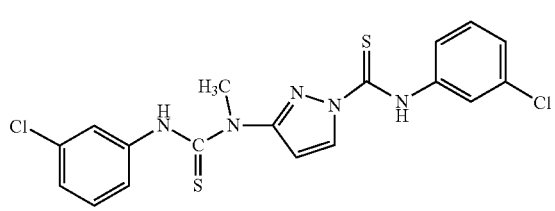

SB54

MIC = 0.15 μM and pharmaceutically-acceptable salts thereof.

Prophylactic and/or therapeutic compositions with specific or broad-spectrum antimicrobial activities are also disclosed. The compositions comprise a copper-activated antimicrobial compound described herein dispersed in a pharmaceutically-acceptable carrier. The term carrier is used herein to refer to diluents, excipients, vehicles, and the like, in which the copper- or zinc-activated antimicrobial may be dispersed for administration. Suitable carriers will be pharmaceutically acceptable. As used herein, the term "pharmaceutically acceptable" means not biologically or otherwise undesirable, in that it can be administered to a subject without excessive toxicity, irritation, or allergic response, and does not cause unacceptable biological effects or interact in a deleterious manner with any of the other components of the composition in which it is contained. A pharmaceutically-acceptable carrier would naturally be selected to minimize any degradation of the compound or other agents and to minimize any adverse side effects in the subject, as would be well known to one of skill in the art. Pharmaceutically-acceptable ingredients include those acceptable for veterinary use as well as human pharmaceutical use, and will depend on the route of administration.

For example, compositions suitable for administration via injection are typically solutions in sterile isotonic aqueous buffer. Exemplary carriers include aqueous solutions such as normal (n.) saline (~0.9% NaCl), phosphate buffered saline (PBS), sterile water/distilled autoclaved water (DAW), various oil-in-water or water-in-oil emulsions, as well as dimethyl sulfoxide (DMSO), micelles, vesicles, or other acceptable vehicles, and the like. Compositions for topical application may include gels, lotions, creams, ointments, pastes, foams, and the like, and will be formulated with appropriate carriers such as petrolatum, paraffin, glycerins, mineral oil, propylene glycol, polyethylene glycol, stearic acid, parabens, vegetable oils, seed/nut oils, and mixtures thereof. Various formulation formats can be envisioned for oral delivery, taking into account gastrointestinal conditions. For example, whereas in the stomach a pH of 1 to 2 can be detected, the pH of the proximal small intestine is about 6.5. It increases to 7.5 in the distal small intestine. This enables pH-targeting of compound release in the small intestine. The compounds are then taken up from the small intestine and the colon. The following enzymes are active in the small intestine and colon: Reducing enzymes (Nitroreductase, Azoreductase, N-oxide reductase, sulfoxide reductase, Hydrogenase etc.) and Hydrolytic enzymes (Esterases, Amidases, Glycosidases, Glucuronidase, sulfatase etc.). In particular, Eudragit polymers (copolymers derived from esters of acrylic and methacrylic acids) are often used as pH-sensitive coatings.

TABLE

| pH-sensitive coatings for hydrogels designed for oral delivery | |
|---|---|
| Polymer | Threshold pH |
| Eudragit L 100 | 6.0 |
| Eudragit S 100 | 7.0 |
| Eudragit L 30 D | 5.6 |
| Eudragit FS 30 | 6.8 |
| Eudragit L 100-55 | 5.5 |
| Polyvinyl acetate phthalate | 4.5-4.8 |
| Hydroxypropyl ethylcellulose phthalate 5 | 5.2 |
| Hydroxypropyl ethylcellulose phthalate 50 | 5.2 |
| Hydroxypropyl ethylcellulose phthalate 55 | 5.4 |
| Cellulose acetate trimelliate | 4.8 |
| Cellulose acetate phthalate | 5.0 |

Oral drug delivery of the compounds can also be achieved using hydrogels of natural or synthetic polymers. The mass/mass ratio of the compounds to hydrogel can vary from 1:100 to 1:10. Typical natural polymers are Guar gum (and other gums), Pectin, Dextran, Alginate, Zein, Chitosan, Chondrotin sulphate and Locust bean gum. Typical Synthesis polymers are Shellac, Ethyl cellulose, Cellulose acetate phthalate, Hydroxy propyl methyl cellulose, Polyvinyl acetate phthalate, and the like. Naturally occurring polysaccharides (e.g. gum, chitosan, alginates, etc.) are broken down by the microfloral in small intestine and colon to simple saccharides. This will enable the release of the compounds. However, they may be subjected to proteolytic digestion. Therefore, bile acids can the attached to —NH$_2$ and —OH groups of the compounds. There are several receptors for bile acids present in the colon, e.g. TGR5. Further, all cholic acids that have an —OH group in the marked position are, principally, suitable. For this purpose, the carboxylic group will be protected as an ester. Linking between the compound and the bile acids will be achieved by means of a urethane bond.

Regardless of the embodiment, the composition can comprise a therapeutically effective amount of the compound dispersed in the carrier. As used herein, a "therapeutically effective" amount refers to the amount that will elicit the biological or medical response of a tissue, system, or subject that is being sought by a researcher or clinician, and in particular elicit some desired therapeutic or prophylactic effect as against the microbial (or fungal) infection by preventing and/or inhibiting microbial activity, infection, and/or replication. One of skill in the art recognizes that an amount may be considered therapeutically "effective" even if the condition is not totally eradicated or prevented, but it or its symptoms and/or effects are improved or alleviated partially in the subject. In some embodiments, the composition will comprise from about 5% to about 95% by weight of an copper-activated antimicrobial compound described herein, preferably from about 30% to about 90% by weight of the copper- or zinc-activated antimicrobial compound, more preferably from about 50% to about 90% by weight of the copper- or zinc-activated antimicrobial compound, based upon the total weight of the composition taken as 100% by weight. In some embodiments, combinations of more than one type of the described copper- or zinc-activated antimicrobial compounds can be included in the composition, in which case the total levels of all such compounds will preferably fall within the ranges described above.

Other ingredients may be included in the composition, such as adjuvants, other active agents, preservatives, buffering agents, salts, other pharmaceutically-acceptable ingredients. The term "adjuvant" is used herein to refer to substances that have immunopotentiating effects and are added to or co-formulated in a therapeutic composition in order to enhance, elicit, and/or modulate the innate, humoral, and/or cell-mediated immune response to improve the efficacy of the administered compound. Other active agents that could be included in the composition include other antimicrobial compounds or any immunogenic active components (e.g., antigens) such as those that resemble a disease-causing microorganism or infectious agent, and/or are made from weakened or killed forms of the same, its toxins, subunits, particles, and/or one of its surface proteins, such that it provokes an immune response to that microorganism or infectious agent.

Compositions according to the embodiments disclosed herein are useful in treating and/or preventing microbial infection from mycobacteria, fungi, Gram-negative bacteria and/or Gram-positive bacteria in a subject, including without limitation, *Mycobacterium tuberculosis, Escherichia coli, S. aureus, S. epidermidis, S. haemolyticus, Enterococcus faecalis, Streptococcus pneumoniae, S. pyogenes, S. mitis, S. mutans, S. bovis*, Group B *Streptococcus, Listeria monocytogenes, Cutibacterium acnes, Chlamydia trachomatis, Klebsiella pneumoniae, Pseudomonas aeruginosa, Enterococcus faecium, Salmonella typhimurium, Bacillus subtilis, Neisseria meningitides, N. gonorrhoeae, Haemophilus influenzae, Acinetobacter baumannii, Mycoplasma* spp., *Cryptococcus neoformans, Candida albicans, Aspergillus* spp., *Histoplasma capsulatum, Malassezia* spp., and the like. This list includes antibiotic resistant bacteria, such as Vancomycin-resistant *E. faecium* (VRE), Methicillin-resistant *S. aureus* (MRSA), and Fluoroquinolone-resistant *Pseudomonas aeruginosa*, which pose a serious clinical threat to people around the globe. Thus, embodiments described herein are antibacterial and preferably antimicrobial, and have broad-spectrum therapeutic and/or prophylactic uses to inhibit microbial infections. The terms "therapeutic" or "treat," as used herein, refer to processes that are intended to produce a beneficial change in an existing condition (e.g., microbial infection, disease, disorder) of a subject, such as by reducing the severity of the clinical symptoms and/or effects of the infection, and/or reducing the duration of the infection/symptoms/effects. The terms "prophylactic" or "prevent," as used herein, refer to processes that are intended to inhibit or ameliorate the effects of a future infection or disease to which a subject may be exposed (but is not currently infected with). In some cases the composition may prevent the development of observable morbidity from infection (i.e., near 100% prevention). In other cases, the composition may only partially prevent and/or lessen the extent of morbidity due to the infection (i.e., reduce the severity of the symptoms and/or effects of the infection, and/or reduce the duration of the infection/symptoms/effects). In either case, the compounds are still considered to "prevent" the target infection or disease. Thus, both treatment and prevention involve "inhibiting" microbial (bacterial and/or fungal) infection.

In use, a therapeutically-effective amount of a copper- or zinc-activated antimicrobial compound is administered to a subject. Encapsulation techniques can also be used to facilitate delivery of the compound. In some embodiments, a composition comprising a therapeutically-effective amount of a copper- or zinc-activated antimicrobial compound is administered to a subject. Regardless, the compound or pharmaceutically acceptable salt thereof will preferably be administered to the subject in an amount sufficient to provide copper- or zinc-activated antimicrobial compound levels (independent of salt, if any) of from about 0.1 to about 20 mg/kg bodyweight of the subject per day. Thus, it will be appreciated that in the case of compound salts, for example, the formulation may be administered in amounts greater than the above ranges to provide sufficient levels of the active compound. The compounds preferably have a minimum inhibitory concentration (MIC) of 10 µM or less, preferably 5 µM or less, more preferably 2.5 µM or less, even more preferably 1.5 µM or less, even more preferably 1.0 µM or less, and in some cases even 0.5 µM or less. The minimum inhibitory concentration is the lowest concentration of compound that inhibits growth of a microorganism in vitro (typically after overnight incubation), and preferably is the amount that inhibits at least 90% of growth.

Upon administration, the mechanism of action entails copper- or zinc-specific and copper- or zinc-dependent activation of the administered compounds that converts the compound into an active form, such as a copper-analog of an iminium cation with potent antimicrobial activity. More particularly, the compounds react with endogenous copper or zinc that has accumulated at the site of infection (due to innate immune response), and the previously inactive compound is transformed into an antimicrobial agent. Thus, a copper- or zinc-mediated immune response is triggered. More particularly, and depending on the state of infection, copper(I) and zinc accumulate at high concentrations at the site of infection and in phagolysosomes (10-100 micromolar concentration). Copper(I) forms a complex of 1:1 stoichiometry with compounds with the novel pyrazole-thioamide NNSN motif, although 2:2 clusters are also possible. Copper (I) complexation leads to the formation of a copper-analog of an iminium cation. Iminium cations are potent warheads that target multiple cell organelles in the bacteria. An exemplary mechanism is depicted in FIG. 1. Similarly, $Zn^{2+}$ can form 1:1 complexes, 1:2 complexes and, potentially, 1:3 complexes (one zinc(II) per three compounds with NNSN motif), as mass spectroscopic results indicate. Much like Cu(I), Zn(II) is tightly regulated within the human body by high-affinity sites. Typically, the concentration of free Zn(II) is maintained below the picomolar range. However, in activated phagolysosomes, Zn(II) concentrations can reach the micromolar level and beyond. The upregulation of both, copper and zinc in activated phagosomes is often referred to as a "brass dagger."

In some embodiments, the subject is afflicted with or suffering from a condition (e.g., infection, disease, or disorder) before the compounds are administered, wherein methods described herein are useful for treating the condition and/or ameliorating the effects of the condition. In other embodiments, the subject is free of a given condition before administering the compound, wherein the methods described herein are useful for preventing the occurrence or incidence of the condition and/or preventing the effects of the condition, as described above. In either case, the compounds are useful for inhibiting microbial infection. The disclosed embodiments are suitable for various routes of administration, depending upon the particular carrier and other ingredients used. For example, the prophylactic and/or therapeutic compounds or compositions can be injected intramuscularly, subcutaneously, intradermally, or intravenously. They can also be administered via mucosa such as intranasally or orally. The compounds or compositions can also be administered topically or through the skin via a transdermal patch.

In some embodiments, the compound or compositions can be provided in unit dosage form in a suitable container. The term "unit dosage form" refers to a physically discrete unit suitable as a unitary dosage for human or animal use. Each unit dosage form may contain a predetermined amount of the inventive compound (and/or other active agents) in the carrier calculated to produce a desired effect. In other embodiments, the compound can be provided separate from the carrier (e.g., in its own vial, ampule, sachet, or other suitable container) for on-site mixing before administration to a subject. A kit comprising the copper- or zinc-activated antimicrobial compound(s) is also disclosed herein. The kit further comprises instructions for administering the compound to a subject. The copper- or zinc-activated antimicrobial compound(s) can be provided as part of a dosage unit, already dispersed in a pharmaceutically-acceptable carrier, or it can be provided separately from the carrier. The kit can further comprise instructions for preparing the copper- or zinc-activated antimicrobial compounds for administration to a subject, including for example, instructions for dispersing the compounds in a suitable carrier.

It will be appreciated that therapeutic and prophylactic methods described herein are applicable to humans as well as for veterinary use for any suitable animal, including, without limitation, dogs, cats, and other companion animals, as well as, rodents, primates, horses, cattle, pigs, etc. The methods can be also applied for clinical research and/or study.

Additional advantages of the various embodiments of the invention will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

EXAMPLES

The following examples set forth methods in accordance with the invention. It is to be understood, however, that these examples are provided by way of illustration and nothing therein should be taken as a limitation upon the overall scope of the invention.

Example 1

Synthesis

Syntheses of Pyrazole Derivatives 1-tert-butyl-1H-pyrazol-3-amine (Compound 1-1)

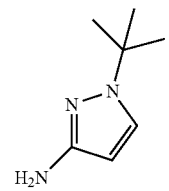

1-1

A solution of 1.54 g (12.40 mmol, 1 equiv.) tert-butylhydrazine hydrochloride in 30 mL of distilled water was cooled to 0° C. Then 1.71 g (12.40 mmol, 1 equiv.) $K_2CO_3$ and 2.08 g (24.80 mmol, 2 equiv.) $NaHCO_3$ were added sequentially. The mixture was kept stirring at 0° C. for 1 h. The resulting solution was clear and colorless. 1.09 g (12.40 mmol, 1 equiv.) 2-chloroacrylonitrile was added at 0° C. The reaction mixture was allowed to warm to RT and then stirred for 12 h. After this time, the solution turned out to be light yellow. The solution was then extracted with ethyl acetate (5 times). The combined organic layers were washed with brine, dried over anhydrous $NaSO_4$, and concentrated to dryness. Descending column chromatography using silica gel as stationary phase and a gradient mixture of $CH_2Cl_2$ and MeOH as eluent gave 681 mg (yield 35%) compound 1-1 as a brown solid. $^1H$ NMR (400 MHZ, Chloroform-d) δ 7.23 (d, J=2.4 Hz, 1H), 5.54 (d, J=2.4 Hz, 1H), 3.63 (bs, 2H), 1.49 (s, 9H). $^{13}C$ NMR (101 MHz, Chloroform-d) δ 153.69, 126.82, 92.15, 57.39, 29.70.

3,5-dimethyl-1H-pyrazole (Compound 1-2)

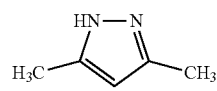

1-2

$H_2SO_4·SiO_2$ was synthesized via known protocols. In a mortar, 100 mg (1.0 mmol, 1 equiv.) 2,4-pentanedione were mixed with 35 mg (1.1 mmol, 1.1 equiv.) of hydrazine, followed by adding 20 mg $H_2SO_4·SiO_2$. The slurry was continuously ground for 5 min and then diluted with 3 mL ethyl acetate. The resulting reaction mixture was filtered, and the filter cake washed three times with ethyl acetate. The filtrate was concentrated to dryness to give 60 mg (yield 62%) compound 1-2 as a white solid. $^1$H NMR (600 MHZ, Chloroform-d) δ 9.09 (bs, 1H), 5.83 (s, 1H), 2.28 (d, J=0.6 Hz, 6H). $^{13}$C NMR (151 MHz, Chloroform-d) δ 144.53, 104.27, 12.31.

3,4,5-trimethyl-1H-pyrazole (Compound 1-3)

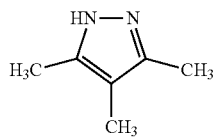

Synthesis of compound 1-3 followed a similar Synthesis route as compound 1-2. $^1$H NMR (400 MHz, Chloroform-d) δ 10.28 (bs, 1H), 2.19 (s, 6H), 1.90 (s, 3H). $^{13}$C NMR (101 MHZ, Chloroform-d) δ 142.10, 110.61, 10.87, 7.62.

N,N-dimethyl-1H-pyrazol-3-amine (Compound 1-4)

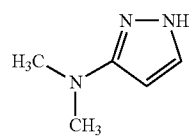

To a solution of 350 mg (4.22 mmol, 1 equiv.) 3-aminopyrazole in 10 mL of methanol at 0° C. 380 mg paraformaldehyde were added. The resulting white slurry was stirred for 2 h at RT under argon. The mixture was then cooled to 0° C., followed by adding 500 mg of NaBH$_3$CN. The reaction mixture was continuously stirred under argon at RT for another 3 h. The resulting reaction mixture was extracted three times with CH$_2$Cl$_2$. The combined organic layers were washed with distilled water, brine, and then dried over MgSO$_4$, filtered and concentrated to give 160 mg (yield 34%) compound 1-4 as yellow oil. $^1$H NMR (400 MHZ, DMSO-d$_6$) δ 11.71 (bs, 1H), 7.41 (bs, 1H), 5.60 (bs, 1H), 2.71 (s, 6H).

N-methyl-1H-pyrazol-3-amine (Compound 1-5)

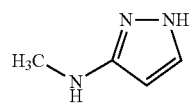

A solution of 970 mg (11.67 mmol) 3-aminopyrazole in 10 mL of formic acid (90%) was stirred at 110° C. for 12 h under argon. The resulting reaction mixture distilled to almost dryness using a rotary evaporator, washed with distilled water, and dried under strong vacuum to give 471 mg (yield 36%) N-(2H-pyrazole-3-yl) formamide as a white solid. To 319 mg (2.9 mmol) of this solid in 10 mL of distilled THF at −10° C. 110 mg (2.9 mmol) of lithium aluminum hydride were added. The reaction mixture was allowed to slowly warm to RT and continuously stirred under argon overnight. After cooling to 0° C., the reaction solution was quenched by adding 0.11 mL of distilled water, 0.11 mL of 15% NaOH aqueous solution, and again 0.33 mL of distilled water. The resulting reaction mixture was stirred at RT for 30 min, dried over MgSO$_4$, filtered and concentrated to dryness to give 311 mg (yield 110%) of compound 1-5 as a brown oil. This oil was used in the subsequent reaction without further purification. $^1$H NMR (400 MHZ, DMSO-d$_6$) δ 7.25 (d, J=2.1 Hz, 1H), 5.33 (d, J=2.1 Hz, 1H), 2.62 (s, 3H).

1H-pyrazole-3-carboxylic acid (Compound 1-6)

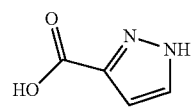

A solution of 3-methyl pyrazole (765 mg, 9.32 mmol) and water (30 mL) was made and allowed to stir at room temperature. To this was slowly added a solution of potassium permanganate (3.2 g, 20.5 mmol) dissolved in water. Following addition, the reaction was left to reflux at 90° C. for 4 hours. The mixture was then filtered and the filtrate collected. The solvent was removed in vacuo and the remaining residue was placed in an ice bath. The pH was changed from 8 to 2 using 2N HCl, producing a white precipitate (1.00 g, 96%). $^1$H NMR (400 MHZ, DMSO-d$_6$) δ 7.72 (d, J=2.2 Hz, 1H), 6.69 (d, J=2.2 Hz, 1H). $^{13}$C NMR (101 MHz, DMSO-d$_6$) δ 163.09, 141.32, 108.35, 11.52.

Methyl 1H-pyrazole-3-carboxylate (Compound 1-7)

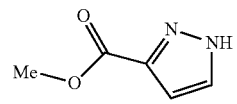

To a solution of 4-nitro-3-pyrazolecarboxylic acid (500 mg, 4.46 mmol) in MeOH (25 mL) was slowly added thionyl chloride (1.062 g, 8.92 mmol) at 0° C. After completion of the addition, the temperature of the reaction mixture was increased to 70° C. and stirred for 5 hours. Methanol was removed in vacuo, and the resulting residue was poured into ice water and extracted with ethyl acetate. The organic layer was washed with 10% NaHCO$_3$ solution, brine, and then dried over Na$_2$SO$_4$. The resulting mixture concentrated in vacuo to reveal a white solid (116 mg, 21%). 1H NMR (600 MHZ, DMSO-d$_6$) δ 7.83 (s, 1H), 6.78-6.77 (m, 1H), 3.80 (s, 3H). $^{13}$C NMR (101 MHz, DMSO-d$_6$) δ 163.03, 107.94, 51.91.

Ethyl 1H-pyrazole-3-carboxylate (Compound 1-8)

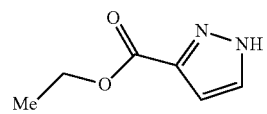

To a solution of 1H-pyrazole-3-carboxylic acid (500 mg, 4.46 mmol) and ethanol (25 mL) was slowly added thionyl chloride (1.06 g, 8.92 mmol) at 0° C. Following addition, this mixture was heated at 70° C. for 5 hours. The solvent was then removed in vacuo and the resulting residue was poured into ice water. The product was then extracted with ethyl acetate and the organic layer washed with 10% sodium bicarbonate, brine, and then dried over anhydrous sodium sulfate. This revealed an off-white solid (84.8 mg, 14%). $^1$H NMR (400 MHZ, DMSO-$d_6$) δ 7.87 (d, J=6.4 Hz, 1H), 6.75 (s, 1H), 4.27 (d, J=7.1 Hz, 2H), 1.28 (d, J=7.1 Hz, 3H). $^{13}$C NMR (101 MHz, DMSO-$d_6$) δ 162.00, 134.57, 108.12, 105.95, 60.56, 14.66, 11.42.

3-(benzyloxy)-1H-pyrazole (Compound 1-9)

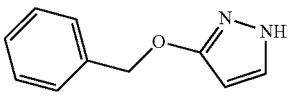

A solution was made by mixing 1-(3-(benzyloxy)-1H-pyrazol-1-yl) ethan-1-one (1.5 g, 6.94 mmol), methanol (10 mL), tetrahydrofuran (15 mL), and 10% sodium hydroxide (0.55 mL). This mixture was left to stir at room temperature for 5 hours. The solvent was then removed in vacuo. The residue was diluted using ethanol and water. The organic layer was washed with brine and dried over anhydrous sodium sulfate. This revealed a white solid (529 mg, 44%). $^1$H NMR (400 MHz, DMSO-$d_6$) δ 11.89 (s, 1H), 7.50 (d, J=2.3 Hz, 1H), 7.43-7.34 (m, 5H), 5.69 (d, J=2.4 Hz, 1H), 5.12 (s, 2H). $^{13}$C NMR (151 MHz, DMSO-$d_6$) δ 163.30, 137.97, 130.38, 128.76, 128.23, 128.19, 89.89, 70.34.

4-nitro-1H-pyrazole (Compound 1-10)

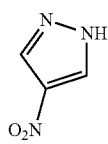

Pyrazole (1 g, 14.7 mmol) was dissolved in concentrated sulfuric acid (3.57 mL). This mixture was heated to 60° C. Concentrated nitric acid was then added dropwise over 30 minutes' time. Following addition, the mixture was left to stir at 60° C. for 1.5 hours. The reaction mixture was then poured into a beaker of ice water, forming a white precipitate (700 mg, 42%). $^1$H NMR (400 MHz, Chloroform-d) δ 8.27 (s, 2H). $^{13}$C NMR (101 MHz, DMSO-$d_6$) δ 136.10, 130.02.

1,2-dihydro-3H-pyrazol-3-one (Compound 1-11)

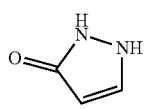

To a solution of methyl-trans-3-methoxyacrylate (1.05 g, 9.03 mmol) in ethanol (10 mL) was added hydrazine hydrate (540 mg, 10.8 mmol). The reaction was kept refluxing under argon overnight. The resulting residue was concentrated to dryness and recrystallized with diethyl ether to give a light yellow solid (770 mg, 99%). $^1$H NMR (400 MHZ, DMSO-$d_6$) δ 10.39 (s, 1H), 7.33 (dd, J=2.3, 0.6 Hz, 1H), 5.41 (dd, J=2.2, 0.6 Hz, 1H). $^{13}$C NMR (101 MHZ, DMSO-$d_6$) δ 161.58, 89.96.

4-bromo-1H-pyrazole (Compound 1-12)

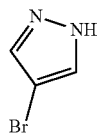

Pyrazole (1 eq) was measured and dissolved in water. While it was being stirred (1 eq) N-bromosuccinimide (dissolved in water) was added to the mixture. The reaction mixture was stirred vigorously at room temperature for 3 hr. The progress of the reaction was monitored by TLC (75% EtOAc/hexane, visualized in PMA). Once the reaction was completed, it was extracted with DCM (three times) and combined organic layer was dried over anhydrous MgSO$_4$. The pure product was obtained by column chromatography. The solvent was removed in vacuo and NMR sample was prepared in DMSO-$D_6$. $^1$H NMR (600 MHZ, DMSO-$d_6$) δ 7.78 (d, 2H). $^{13}$C NMR (151 MHZ, DMSO-$d_6$) δ 139.46, 129.27, 92.20.

3-methyl-5-phenyl-1H-pyrazole (Compound 1-13)

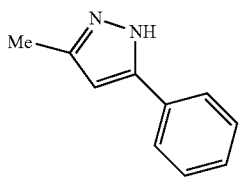

1-benzoylacetone was (500 mg, 3.08 mmol) dissolved in EtOH and started to stir. While it was being stirred, (1 eq) of hydrazine mixed with EtOH was added to the stirring mixture. The reaction mixture was refluxed for 3 hr. The progress of the reaction was monitored by TLC (50% EtOAc/hexane). No further purification was needed as TLC showed only single product spot. All the volatile components were removed in vacuo and obtained white solid product. NMR sample was prepared in DMSO-$D_6$. $^1$H NMR (400 MHZ, DMSO-$d_6$) δ 7.73 (d, J=7.6 Hz, 2H), 7.36 (t, J=7.6 Hz, 2H), 7.25 (t, J=7.4 Hz, 1H), 6.41 (s, 1H), 2.23 (s, 3H). $^{13}$C NMR (151 MHz, DMSO-$d_6$) δ 150.86, 139.94, 134.41, 129.03, 127.57, 125.40, 101.44, 10.97.

Syntheses of Isothiocyanate Derivatives 2-chlorophenyl dithiocarbamate salt (Compound 2-1)

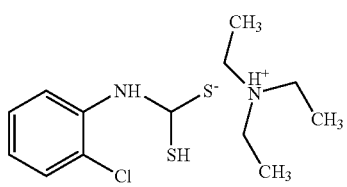

2-1

A mixture was prepared by the addition of NEt3 (3.03 g, 30 mmol) and CS2 (1.90 g, 25 mmol). This was cooled to 0° C. using an ice bath. To this was added 2-chloroaniline, (0.93 g, 10 mmol) dropwise. Upon complete addition of the aniline, the reaction mixture was allowed to warm to room temperature and left to stir for 24 hours. The solid was separated via gravity filtration and washed using 95% ethyl acetate/hexane (5 mL×4). 1H NMR (400 MHZ, Chloroform-d) δ 9.28 (s, 1H), 8.45 (s, 1H), 7.37 (s, 1H), 7.23 (s, 1H), 7.06 (s, 2H), 6.69 (s, 1H), 3.20 (s, 6H), 1.34 (s, 9H). 13C NMR (101 MHz, Chloroform-d) δ 215.71, 137.88, 129.59, 129.27, 127.84, 126.71, 126.65, 126.50, 125.68, 119.18, 116.10, 46.24, 9.50.

2-chlorophenyl isothiocyanate (Compound 2-2)

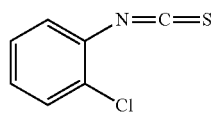

2-2

A solution was prepared by the addition of 2-chlorophenyl dithiocarbamate salt (4.62 g, 15.2 mmol) and sodium bicarbonate, (2.55 g, 30.4 mmol) dissolved in 100 mL of ethyl acetate/water (1:1). This solution was cooled to 0° C. using an ice bath. Iodine (3.85 g, 15.2 mmol) was then added pinch-wise over a period of 30 minutes. The organic layer was separated, and the aqueous phase extracted with DCM and brine. The combined organic layers were dried over anhydrous Na2SO4, filtered and the solvent was removed in vacuum. The product was then purified with a short silica column using hexane as the solvent yielding 2.57 g compound 2-1 as clear yellow oil. 1H NMR (400 MHZ, Chloroform-d) δ 7.47-7.36 (m, 1H), 7.32-7.15 (m, 3H). 13C NMR (101 MHz, Chloroform-d) δ 139.06, 132.01, 130.38, 130.02, 128.21, 127.84, 126.90.

3-chlorophenyl isothiocyanate (Compound 2-2)

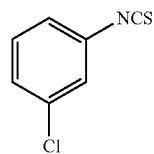

2-2

To a solution of ((3-chlorophenyl)amino) (21-sulfaneyl) methanethione (2.15 g, 7.09 mmol), sodium bicarbonate (1.2 g, 14.2 mmol), ethyl acetate (12.5 mL), and water (12.5 mL) was added iodine crystals (1.8 g, 7.09 mmol) pinch-wise at 0° C. The ethyl acetate layer was washed with sodium thiosulfate, water, and brine, and then dried over anhydrous sodium sulfate. A column was run using hexane to yield a light yellow oil (1.1 g, 92%). ¹H NMR (400 MHZ, Chloroform-d) 87.32-7.22 (m, 2H), 7.26-7.19 (m, 1H), 7.11 (dt, J=7.2, 1.9 Hz, 1H). ¹³C NMR (101 MHZ, Chloroform-d) δ 135.34, 132.87, 130.71, 127.80, 126.11, 124.16.

4-chlorophenyl isothiocyanate (Compound 2-3)

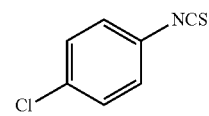

2-3

To a solution of ((4-chlorophenyl)amino) (λ¹-sulfaneyl) methanethione (14 g, 46 mmol), sodium bicarbonate (7.7 g, 92 mmol), ethyl acetate (50 mL), and water (50 mL) was added iodine crystals (10.8 g, 46 mmol) pinch-wise at 0° C. The ethyl acetate layer was washed with sodium thiosulfate, water, and brine, and then dried over anhydrous sodium sulfate. A column was run using hexane to yield a light yellow solid (3.5 g, 45%). ¹H NMR (400 MHZ, DMSO-$d_6$) δ 7.54-7.45 (m, 4H). ¹³C NMR (101 MHZ, DMSO-$d_6$) δ 134.95, 132.70, 130.36, 129.53, 128.81, 128.23, 125.77.

2-isothiocyanato-1,3-dimethylbenzene (Compound 2-4)

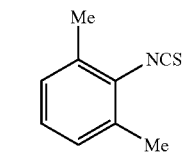

2-4

2,6-dimethylaniline (2 g) was measured into a RBF. K₂CO₃ (2 eq) was dissolved in water and transferred to aniline. While it was being stirred, (1.2 eq) CS₂ was added to the reaction mixture dropwise. Stirred the reaction mixture for 4 hr at room temperature. After 4 hr, reaction mixture was cooled down to 0° C. and (0.5 eq) of Cyanuric chloride (TCT) in DCM was added and continue stirring for 30 min. Afterward, the reaction was basified to pH 11 by using 6N NaOH. Reaction was extracted with DCM and combined organic layers were dried over anhydrous Na₂SO₄. And solvent was evaporated in vacuo. Flash chromatography was conducted to isolate the desired product. NMR sample was prepared in DMSO-D₆. ¹H NMR (600 MHz, DMSO-$d_6$) δ 7.14 (d, J=2.7 Hz, 2H), 3.36 (s, 1H), 2.29 (s, 6H). ¹³C NMR (151 MHz, DMSO-$d_6$) δ 135.10, 128.55, 127.84, 18.59.

1,2-dichloro-3-isothiocyanatobenzene (Compound 2-5)

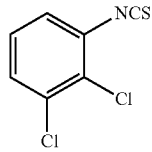

To an RBF was added (2,3-dichlorophenyl) carbamodithioate (34.2 g, 144.2 mmol), triethylamine (20.1 mL, 144.2 mmol), and chloroform (200 mL). This solution was cooled using an ice bath. Ethyl chloroformate (13.7 mL, 144.2 mmol) was added slowly at 0° C. This was left to stir for 1 hour at this temperature. The organic layer was then washed with 2N HCl and water then dried over anhydrous sodium sulfate. The solvent was removed in vacuo and the resulting solid dried under high vacuum. The crude product (8.11 g, 27.5%) required no further purification.

2,4-dichloro-1-isothiocyanatobenzene (Compound 2-6)

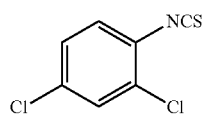

To an RBF was added (2,4-dichlorophenyl) carbamodithioate (72 g, 303.6 mmol), triethylamine (42.3 mL, 303.6 mmol), and chloroform (500 mL). This solution was cooled using an ice bath. Ethyl chloroformate (26.9 mL, 303.6 mmol) was added slowly at 0° C. This was left to stir for 1 hour at this temperature. The organic layer was then washed with 2N HCl and water then dried over anhydrous sodium sulfate. The solvent was removed in vacuo and the resulting solid dried under high vacuum. The crude product (29.2 g, 47.1%) required no further purification.

1,2-dichloro-4-isothiocyanatobenzene (Compound 2-7)

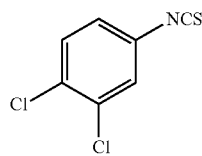

To an RBF was added (3,4-dichlorophenyl) carbamodithioate (9.2 g, 38.8 mmol), triethylamine (5.42 mL, 38.8 mmol), and chloroform (50 mL). This solution was cooled using an ice bath. Ethyl chloroformate (3.69 mL, 38.8 mmol) was added slowly at 0° C. This was left to stir for 1 hour at this temperature. The organic layer was then washed with 2N HCl and water then dried over anhydrous sodium sulfate. The solvent was removed in vacuo and the resulting solid dried under high vacuum. The crude product (3.34 g, 42.2%) required no further purification.

Syntheses of NNSN Thiourea Molecules.

Synthesis Route A:

1-(1-tert-butyl-1H-pyrazol-3-yl)-3-(4-chlorophenyl)thiourea (Compound SB02)

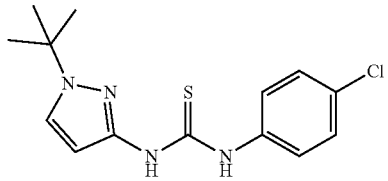

To a solution of 561 mg (4.04 mmol, 1 equiv.) compound 1-1 in 30 mL of distilled THF, 753 mg (4.44 mmol, 1.1 equiv.) 4-chlorophenyl isothiocyanate was added. The resulting dark yellow reaction solution was kept stirring under argon at RT for 24 hr. The resulting reaction mixture was concentrated to dryness and crystallized using anhydrous diethyl ether to give 915 mg (yield 74%) of compound SB02 as a white solid. $^1$H NMR (600 MHZ, DMSO-$d_6$) δ 11.92 (bs, 1H), 10.83 (bs, 1H), 7.80 (d, J=2.5 Hz, 1H), 7.75 (d, J=8.8 Hz, 2H), 7.44 (d, J=8.8 Hz, 2H), 6.00 (s, 1H), 1.51 (s, 9H). $^{13}$C NMR (151 MHZ, DMSO-$d_6$) δ 175.75, 148.23, 137.99, 128.82, 128.50, 127.97, 124.82, 94.50, 58.33, 29.12.

Synthesis Route B:

1-(benzo[c][1,2,5]thiadiazol-4-yl)-3-(4-chlorophenyl)thiourea (Compound SB36)

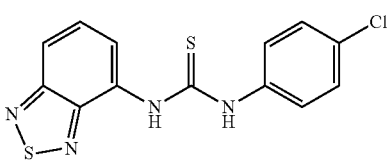

A solution of 20 mg (0.132 mmol, 1 equiv.) 4-amino-2,1,3-benzothiadiazole and 22 mg (0.132 mmol, 1 equiv.) 4-chlorophenyl isothiocyanate in 10 mL of distilled THF was kept refluxing under argon for 20 hr. The resulting reaction mixture was concentrated to dryness and separated by means of column chromatography on silica gel using a gradient mixture of $CH_2Cl_2$ and MeOH as eluent to give 17 mg (yield 53%) of compound SB36 as yellow solid. $^1$H NMR (400 MHZ, DMSO-$d_6$) δ 10.45 (s, 1H), 10.30 (s, 1H), 8.47 (dd, J=7.4, 1.0 Hz, 1H), 7.85 (dd, J=8.8, 1.0 Hz, 1H), 7.72 (dd, J=8.8, 7.4 Hz, 1H), 7.62 (d, J=8.8 Hz, 2H), 7.42 (d, J=8.8 Hz, 2H). $^{13}$C NMR (101 MHZ, DMSO-$d_6$) δ 179.04, 154.86, 149.59, 138.10, 131.15, 130.49, 128.80, 128.40, 125.58, 120.03, 116.90.

1-(4-chlorophenyl)-3-(4-iodo-1H-pyrazol-3-yl)thiourea (Compound SB48)

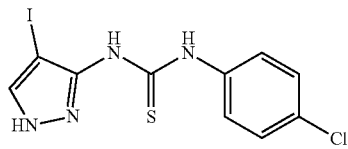

¹H NMR (400 MHZ, Chloroform-d) δ 10.52 (s, 1H), 8.71 (d, J=0.5 Hz, OH), 7.76-7.71 (m, 3H), 7.41-7.37 (m, 2H). ¹³C NMR (101 MHz, Chloroform-d) δ 171.78, 154.82, 136.12, 135.74, 132.38, 130.04, 129.37, 127.15, 124.96, 67.29, 14.22. IR.

Synthesis Route C:

1-(4-chlorobenzyl)-3-(1-methyl-1H-pyrazol-3-yl)urea (Compound SB03)

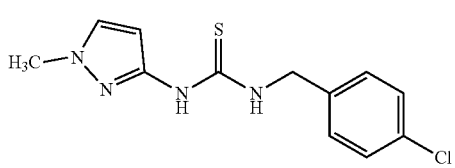

1-methyl-1H-pyrazol-3-amine (92 mg, 0.95 mmol) was dissolved in DCM and stirred in a 100 mL round bottom flask. 4-chlorobenzyl isocyanate (159 mg, 0.95 mmol, 1 eq) dissolved in DCM was added to the reaction dropwise, stirred for 5 min at r.t and refluxed at 60° C. for 16 hr. The reaction was monitored by TLC (25% EtOAc/hexanes). Volatile components were removed under vacuum and resulting solid precipice was re-crystallized with MeOH. Retrieved white color solid, 5 (60%) was oven-dried. ¹H NMR (600 MHZ, DMSO-d₆) δ 7.46 (s, 1H), 7.38 (m, 2H), 7.26 (m, 2H), 6.55 (t, J=6.1 10 Hz, 1H), 4.21 (d, J=6.1 Hz, 2H), 3.88 (s, 3H). ¹³C NMR (151 MHZ, DMSO-d₆) δ 158.18, 149.27, 140.52, 131.49, 130.35, 129.29, 128.61, 96.40, 42.74, CH₃ overlapped with DMSO-d₆. FTIR, cm⁻¹: 3322 (—NH—), 3052, 2976 (C—H aromatic), 1574 (C—O), 1491 (aromatic C=N), 1294 (C=S), 731 (aromatic C—Cl).

1-(1-(tert-butyl)-1H-pyrazol-3-yl)-3-(4-chlorobenzyl)urea (Compound SB04)

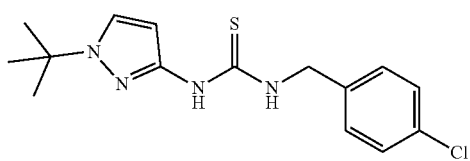

¹H NMR (400 MHZ, Chloroform-d) δ 10.31 (s, 1H), 8.59 (s, 1H), 7.34-7.32 (m, 4H), 5.75 (1H), 4.88 (2H), 1.40 (s, 9H). ¹³C NMR (101 MHZ, Chloroform-d) δ 178.17, 148.53, 136.35, 133.59, 129.44, 129.05, 126.69, 93.38, 58.71, 49.34, 29.54. FTIR, cm⁻¹: 3250, 3186 (—NH—), 2977 (C—H aromatic), 2080 (—CH₃), 1583 (aromatic C=C), 1546 (aromatic C=N), 1222 (C=S), 764 (aromatic C—Cl).

Synthesis Route D:

1-(4-chlorobenzyl)-3-(1H-pyrazol-3-yl)thiourea (Compound APM02)

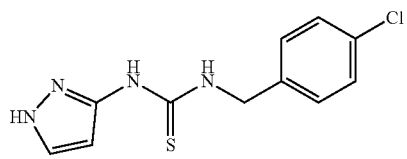

1H-pyrazol-3-amine (1 g, 12.04 mmol) was dissolved in DCM and stirred in a 100 mL round bottom flask. 4-Chlorobenzyl isothiocyanate (2.2 g, 12.04 mmol) was dissolved in DCM separately and added to the stirring reaction dropwise. The reaction was then refluxed for 20 hours at 60° C. All volatile components were evaporated under vacuum and resulting crude product was purified by flash column chromatography (100% hexanes to 25% EtOAc/hexanes) to afford APM02 as a white colored solid. ¹H NMR (400 MHZ, DMSO-d₆) δ 9.86 (t, J=6.3 Hz, 1H), 8.29 (d, J=2.9 Hz, 1H), 7.37 (m, 2H), 7.35 (s, 2H), 5.87 (d, J=2.9 Hz, 1H), 5.57 (s, 1H), 4.79 (d, J=6.3 Hz, 2H). ¹³C NMR (101 MHZ, DMSO-d₆) δ 175.11, 159.26, 137.76, 133.18, 132.26, 130.13, 128.90, 101.56, 47.48. FTIR, cm⁻¹: 3278 (—NH—), 3112 (C—H aromatic), 1564 (aromatic C=C), 1524 (aromatic C=N), 1268 (C=S), 724 (aromatic C—Cl).

1-(4-chlorophenyl)-3-(1H-pyrazol-3-yl)thiourea (Compound APM04)

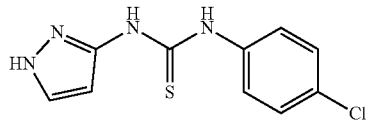

¹H NMR (600 MHZ, DMSO-d₆) δ 12.70 (s, 1H), 11.78 (s, 1H), 10.83 (s, 1H), 7.76 (d, J=2.4 Hz, 1H), 7.76 (m, 2H), 7.44 (m, 2H), 6.04 (s, 1H). ¹³C NMR (151 MHz, DMSO-d₆) δ 176.74, 149.74, 138.41, 130.20, 129.57, 128.86, 126.27, 94.81. FTIR, cm⁻¹: 3361 (—NH—), 3060 (C—H aromatic), 1577 (aromatic C=C), 1524 (aromatic C=N), 1258 (C=S), 754 (aromatic C—Cl).

1-(4-chlorophenyl)-3-(1-methyl-1H-pyrazol-3-yl)thiourea (Compound SB01)

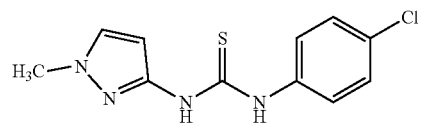

¹H NMR (600 MHZ, DMSO-d₆) δ 7.70 (d, J=2.3 Hz, 2H), 7.67 (d, J=2.3 Hz, 2H), 7.43 (d, 1H), 6.01 (s, 1H), 3.82 (s, 3H). ¹³C NMR (151 MHz, DMSO-d₆) δ 176.63, 149.12, 138.45, 132.38, 129.59, 129.17-128.40 (m), 126.22, 95.32, 39.02. FTIR, cm⁻¹: 3186 (—NH—), 3013 (C—H aromatic), 1573 (aromatic C=C), 1526 (aromatic C=N), 1266 (C=S), 659 (aromatic C—Cl).

1-(4-nitrophenyl)-3-(1H-pyrazol-3-yl)thiourea (Compound SB28)

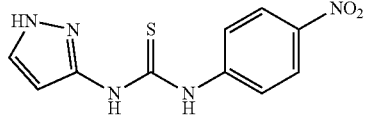

¹H NMR (400 MHZ, DMSO-d₆) δ 12.76 (NH, 1H), 11.03 (NH, 1H), 8.24 (d, J=8.5 Hz, 2H), 8.05 (d, J=8.3 Hz, 2H), 7.75 (d, J=7.4 Hz, 1H), 6.10 (d, J=7.4 Hz, 1H). ¹³C NMR (101 MHz, DMSO-d₆) δ 176.55, 149.63, 146.04, 143.91, 130.54, 125.05, 123.21, 95.57. FTIR, cm⁻¹: 3303 (—NH—), 3060 (C—H aromatic), 1645 (aromatic C=C), 1593 (aromatic C=N), 1272 (C=S), 1483 and 1316 (N=O). MIC (MRSA)=5 µM; Binding constant (M⁻¹): 1200.

Compound SB29

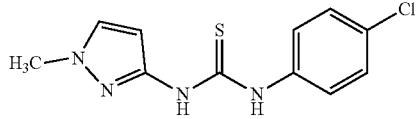 [SMILES: Cn1ccc(NC(=S)Nc2ccc(Cl)cc2)n1]

Binding constant (M⁻¹): 1150.
Syntheses of NNSN Urea Molecules.
Synthesis Route A:

1-(1-(tert-butyl)-1H-pyrazol-3-yl)-3-(4-chlorophenyl)urea (Compound SB10)

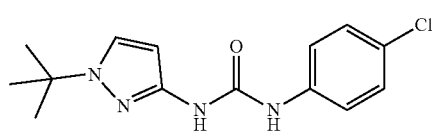

1H NMR (600 MHZ, DMSO-d₆) δ 9.15 (s, NH), 7.67 (d, J=2.4 Hz, 1H), 7.48 (m, 2H), 7.33 (m, 2H), 6.17 (s, 1H), 1.49 (s, 9H). ¹³C NMR (151 MHz, DMSO-d₆) δ 152.31, 147.36, 139.02, 129.14, 127.63, 125.84, 120.08, 94.82, 58.01, 29.72. Binding constant (M⁻¹): 1786.13. MIC (µM): NA.

1-(4-chlorophenyl)-3-(1-methyl-1H-pyrazol-3-yl)urea (Compound SB11)

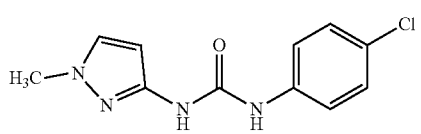

¹H NMR (600 MHZ, DMSO-d₆) δ 8.78 (s, NH), 7.79 (d, J=2.3 Hz, 1H), 7.48 (d, J=8.9 Hz, 2H), 7.33 (d, J=8.8 Hz, 2H), 6.27 (d, J=2.3 Hz, 1H), 3.88 (s, 3H). ¹³C NMR (151 MHZ, DMSO-d₆) δ 154.81, 150.21, 139.02, 133.25, 129.11, 125.94, 120.42, 95.27, CH₃ overlapped with DMSO-d₆. Binding constant (M⁻¹): <100 no binding observed. MIC (µM): NA.

Synthesis Route B:

1-(4-chlorobenzyl)-3-(1-methyl-1H-pyrazol-3-yl)thiourea (Compound SB12)

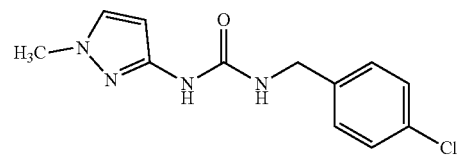

¹H NMR (400 MHZ, Chloroform-d) δ 9.77 (s, 1H), 8.00 (s, 1H), 6.99 (m, 4H), 6.87 (d, J=2.3 Hz, 1H), 5.42 (d, J=2.3 Hz, OH), 4.61 (dd, 2H), 3.41 (d, J=1.3 Hz, 3H). ¹³C NMR (101 MHZ, Chloroform-d) δ 178.71, 154.57, 148.93, 136.57, 131.32, 129.05, 94.14, 92.95, 49.02, 38.63. Binding constant (M⁻¹): <100 no binding observed. MIC (µM): NA.

1-(1-(tert-butyl)-1H-pyrazol-3-yl)-3-(4-chlorobenzyl)thiourea (Compound SB13)

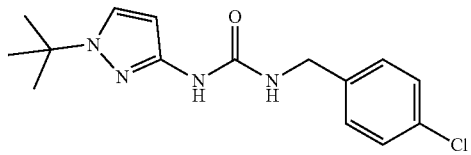

¹H NMR (400 MHZ, DMSO-d₆) δ 11.85 (s, 1H), 10.81 (s, 1H), 7.79 (d, J=2.5 Hz, 1H), 7.74 (d, 1H), 7.43 (d, 1H), 5.98 (m, 1H), 1.50 (s, 9H). ¹³C NMR (101 MHz, DMSO-d₆) δ 176.42, 148.88, 138.65, 129.48, 129.16, 128.63, 125.49, 95.17, 58.99, 29.79. Binding constant (M⁻¹): 70. MIC (µM): NA.

Synthesis of Pyrazole Thioamides with New NNSN Motif
Synthesis Route A:

N-(2-chlorophenyl)-1H-pyrazole-1-carbothioamide (SB46)

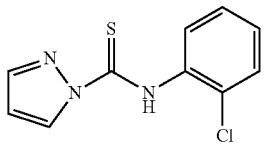

A solution of pyrazole (29.3 mg, 0.353 mmol), 2-chlorophenyl isothiocyanate (65.9 mg, 0.388 mmol, and dichloromethane (10 mL) was stirred at room temperature for 24 hours. The solvent was removed in vacuo, revealing a white solid (60 mg, 71%). $^1$H NMR (400 MHZ, Chloroform-d) δ 11.16 (s, 1H), 8.64 (dd, J=8.2, 1.6 Hz, OH), 7.75 (dd, J=1.7, 0.8 Hz, OH), 7.63 (d, J=2.1 Hz, 2H), 7.49 (dd, J=8.0, 1.5 Hz, OH), 7.40-7.35 (m, 1H), 7.24 (dd, J=1.5, 0.6 Hz, OH), 6.37 (t, J=2.1 Hz, 1H). $^{13}$C NMR (101 MHz, Chloroform-d) δ 142.99, 131.35, 130.38, 129.86, 128.19, 127.82, 127.61, 127.36, 126.91, 124.97, 110.20. FTIR, cm$^{-1}$: 3277 (—NH), 3149 (C—H aromatic), 1580 (aromatic C=C), 1516 (aromatic C=N), 1231 (C=S), 730 (aromatic C—Cl).

3-amino-N-(2-chlorophenyl)-1H-pyrazole-1-carbothioamide (SB49)

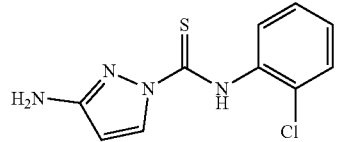

$^1$H NMR (400 MHZ, Chloroform-d) δ 10.65 (s, 1H), 8.54-8.52 (m, 1H), 7.46 (dd, J=8.0, 1.5 Hz, 2H), 7.35 (dddd, J=8.1, 6.7, 1.5, 0.5 Hz, 1H), 7.21-7.17 (m, 1H), 5.94-5.93 (m, 1H), 4.07 (s, 4H). $^{13}$C NMR (151 MHZ, Chloroform-d) δ 207.39, 154.21, 130.85, 128.29, 92.78, 57.57, 30.99, 29.72, 28.34. FTIR, cm$^{-1}$: 3420 (—NH$_2$), 3328 (—NH—), 3199 (C—H aromatic), 1584 (aromatic C=C), 1531 (aromatic C=N), 1239 (C=S), 745 (aromatic C—Cl).

3-amino-N-(3-chlorophenyl)-1H-pyrazole-1-carbothioamide (SB50)

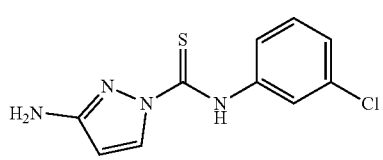

$^1$H NMR (400 MHZ, Chloroform-d) δ 10.28 (s, 1H), 8.52 (d, J=3.0 Hz, 1H), 7.88 (t, J=2.0 Hz, 1H), 7.64 (ddd, J=8.1, 2.2, 1.0 Hz, 1H), 7.33 (t, J=8.1 Hz, 1H), 7.23 (ddd, J=8.1, 2.0, 1.0 Hz, 1H), 5.92 (d, J=3.0 Hz, 1H), 4.05 (s, 2H). $^{13}$C NMR (101 MHz, Chloroform-d) δ 171.39, 156.93, 138.85, 134.67, 133.07, 130.05, 126.66, 123.68, 121.79, 101.20. FTIR, cm$^{-1}$: 3413 (—NH$_2$), 3320 (—NH—), 3242 (C—H aromatic), 2918, 2849 (CH pyrazole), 1586 (aromatic C=C), 1530 (aromatic C=N), 1239 (C=S), 770 (aromatic C—Cl).

N-(3-chlorophenyl)-1H-pyrazole-1-carbothioamide (SB52)

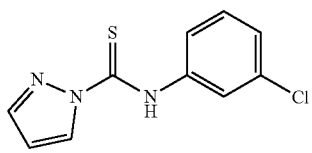

$^1$H NMR (400 MHZ, Chloroform-d) δ 10.75 (s, 1H), 8.74 (dd, J=2.8, 0.8 Hz, 1H), 7.93 (t, J=2.0 Hz, 1H), 7.68-7.65 (m, 1H), 7.37 (t, J=8.1 Hz, 1H), 7.11 (dt, J=7.2, 2.0 Hz, 1H), 6.36 (t, J=2.1 Hz, 1H). $^{13}$C NMR (101 MHZ, Chloroform-d) δ 173.16, 142.80, 138.48, 134.83, 131.38, 130.71, 130.20, 127.80, 127.14, 126.11, 124.16, 123.70, 121.80, 110.23, 105.44. FTIR, cm$^{-1}$: 3258 (—NH—), 3093 (C—H aromatic), 1585 (aromatic C=C), 1539 (aromatic C=N), 1298 (C=S), 769 (aromatic C—Cl).

N-(4-isothiocyanatophenyl)-1H-pyrazole-1-carbothioamide (SB78)

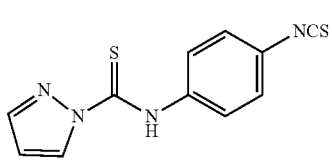

$^1$H NMR (400 MHZ, DMSO-d$_6$) δ 11.96 (s, 1H), 8.76 (dd, J=8.0, 2.9 Hz, 1H), 8.00 (d, J=3.9 Hz, 1H), 7.74 (s, 1H), 7.52 (s, 4H). $^{13}$C NMR (101 MHZ, DMSO-d$_6$) δ 174.75, 143.97, 139.41, 137.89, 132.44, 129.65, 128.01, 126.61, 124.64, 110.64 (d, J=14.9 Hz), 104.67. FTIR, cm$^{-1}$: 3241 (—NH), 2919, 2851 (C—H aromatic), 2087 (—NCS), 1510 (aromatic C=C), 1417 (—CH$_3$), 1294 (aromatic C=N), 1282 (C=S), 751 (aromatic C—Cl).

3-amino-N-(4-isothiocyanatophenyl)-1H-pyrazole-1-carbothioamide (SB79)

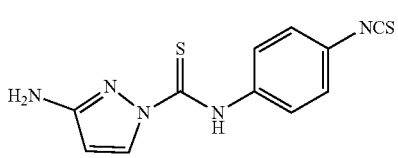

$^1$H NMR (400 MHZ, DMSO-d$_6$) δ 8.43 (dd, J=4.8, 3.0 Hz, 1H), 7.78-7.73 (m, 1H), 7.65 (d, J=4.0 Hz, 1H), 7.53-

7.43 (m, 2H), 5.99 (t, J=2.9 Hz, 1H), 5.72 (s, 2H). $^{13}$C NMR (101 MHZ, DMSO-d$_6$) δ 173.05, 159.13 (d, J=7.2 Hz), 138.26, 136.37, 133.72, 133.11 (d, J=5.1 Hz), 128.02, 127.49, 126.50 (d, J=9.1 Hz), 125.36, 102.62. FTIR, cm$^{-1}$: 3415 (—NH), 3329, 3244 (C—H aromatic), 2082 (—NCS), 1570 (aromatic C=C), 1475 (—CH$_3$), 1293 (aromatic C=N), 1258 (C=S), 761 (aromatic C—Cl).

N,N-(1,4-phenylene)bis(1H-pyrazole-1-carbothioamide) (SB80)

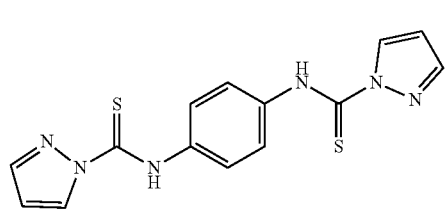

$^1$H NMR (400 MHZ, DMSO-d$_6$) δ 8.76 (ddd, J=8.4, 2.8, 0.7 Hz, 1H), 8.03-7.96 (m, 1H), 7.74-7.70 (m, 2H), 7.53-7.49 (m, 4H), 6.26 (s, 2H). $^{13}$C NMR (101 MHz, DMSO-d$_6$) δ 174.75 (d, J=4.8 Hz), 143.90 (d, J=9.5 Hz), 137.95, 136.73, 135.22, 134.06, 132.43, 129.65, 128.01, 127.26, 126.61, 126.14, 110.62 (d, J=13.1 Hz), 104.67. FTIR, cm$^{-1}$: 3275, 3120 (—NH), 1506 (aromatic C=C), 1293 (aromatic C=N), 1225 (C=S), 764 (aromatic C—Cl).

N,N-(1,4-phenylene)bis(3-amino-1H-pyrazole-1-carbothioamide) (SB81)

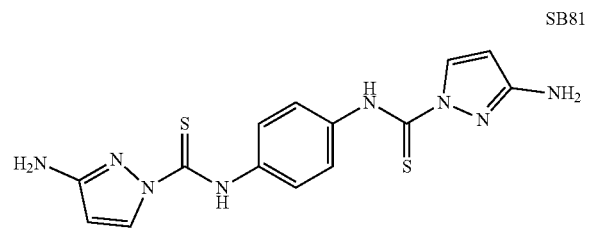 [SMILES: Nc1ccn(C(=S)Nc2ccc(NC(=S)n3ccc(N)n3)cc2)n1]

$^1$H NMR (400 MHZ, DMSO-d$_6$) δ 7.25 (s, 1H), 6.26 (t, J=2.0 Hz, 1H), 5.38 (s, 1H), 4.57 (s, 2H). $^{13}$C NMR (101 MHz, DMSO-d$_6$) δ (214.47, 212.55, 192.41, 181.79, 164.46, 162.03, 160.36, 131. 74, 119.57, 104.68, 92.89, 91.10, 90.71, 74.74. IR 3-amino-N-(4-chlorobenzyl)-1H-pyrazole-1-carbothioamide (APM01)

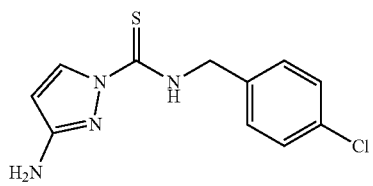

$^1$H NMR (400 MHZ, DMSO-d$_6$) δ 10.55 (s, 1H), 7.38 (d, J=2.0 Hz, 1H), 7.36 (s, 2H), 7.35 (s, 2H), 7.33 (d, J=2.4 Hz, 2H), 5.40 (d, J=2.0 Hz, 1H), 4.77 (d, J=4.6 Hz, 2H). $^{13}$C NMR (101 MHz, DMSO-d$_6$) δ 176.76, 152.41, 142.01, 137.33, 132.27, 130.12, 128.91, 89.21, 46.44. FTIR, cm$^{-1}$: 3406, 3297 (—NH$_2$), 3247 (—NH—), 3047 (C—H aromatic), 2960, 2919 (CH pyrazole), 1605 (aromatic C=C), 1517 (aromatic C=N), 1215 (C=S), 731 (aromatic C—Cl).

3-amino-N-(4-chlorophenyl)-1H-pyrazole-1-carbothioamide (APM03)

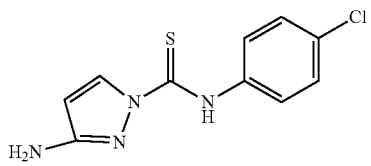

$^1$H NMR (400 MHZ, DMSO-d$_6$) δ 10.99 (s, J=4.5 Hz, 1H), 8.41 (s, 1H), 7.67 (d, 2H), 7.45 (d, 2H), 6.98 (s, 1H). $^{13}$C NMR (151 MHZ, DMSO-d$_6$) δ 176.30, 149.26, 137.93, 129.68, 129.08, 128.35, 125.75, 94.31. FTIR, cm$^{-1}$: 3471, 3460 (—NH$_2$), 3305 (—NH—), 3060-3005 (C—H aromatic), 2960, 2920 (CH pyrazole), 1610, 1588 (aromatic C=C), 1516 (aromatic C=N), 1242 (C=S), 640 (aromatic C—Cl).

N-(4-nitrophenyl)-1H-pyrazole-1-carbothioamide (SB21)

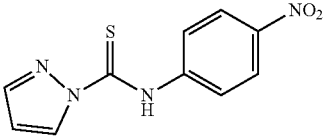

$^1$H NMR (400 MHZ, DMSO-d$_6$) δ 8.77 (d, J=2.9 Hz, 1H), 8.29 (t, 2H), 8.04 (d, 2H), 7.66 (d, 1H), 6.68 (t, 1H). $^{13}$C NMR (101 MHZ, DMSO-d$_6$) δ 144.43, 132.77, 127.95, 126.51, 126.01, 124.71, 111.28, 104.87. FTIR, cm$^{-1}$: 3254 (—NH—), 3125 (C—H aromatic), 1605 (aromatic C=C), 1593 (aromatic C=N), 1238 (C=S), 1501 and 1322 (N=O).

3-amino-N-(4-nitrophenyl)-1H-pyrazole-1-carbothioamide (SB27)

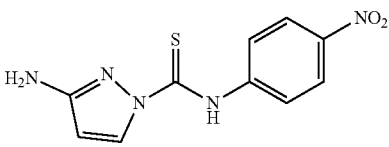

1H NMR (400 MHZ, DMSO-d$_6$) δ 11.35 (s, N—H), 8.44 (d, J=3.0 Hz, 1H), 8.26 (d, 2H), 8.05 (d, 2H), 6.04 (d, J=3.1 Hz, 1H), 5.85 (s, NH$_2$). $^{13}$C NMR (151 MHZ, DMSO-d$_6$) δ

172.90, 159.33, 144.98, 144.54, 133.27, 125.10, 124.43, 103.37. FTIR, cm$^{-1}$: 3492 and 3380 (—NH$_2$), 3228 (—NH—), 3140 (C—H aromatic), 1610 (aromatic C=C), 1593 (aromatic C=N), 1251 (C=S), 1502 and 1329 (N=O).

3-amino-N-(4-methoxyphenyl)-1H-pyrazole-1-carbothioamide (SB31)

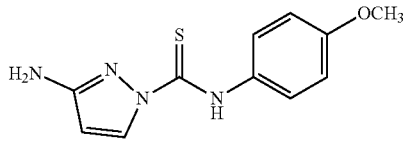

$^1$H NMR (400 MHZ, DMSO-d$_6$) δ 7.73 (d, J=2.4 Hz, 1H), 7.44 (d, J=8.5 Hz, 2H), 6.93 (d, 2H), 6.01 (s, 1H), 3.76 (s, 3H). $^{13}$C NMR (101 MHZ, DMSO-d$_6$) δ 177.36, 157.56, 150.18, 132.52, 130.29, 126.85, 114.33, 94.83, 55.94. FTIR, cm$^{-1}$: 3413 (—NH$_2$), 3184 (—NH—), 3051 (C—H aromatic), 2929 (C—H), 1583 (aromatic C=C), 1535 (aromatic C=N), 1250 (C=S), 1232 (C—O).

3-amino-N-(p-tolyl)-1H-pyrazole-1-carbothioamide (SB32)

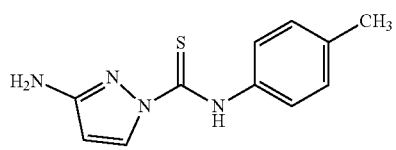

$^1$H NMR (400 MHZ, DMSO-d$_6$) δ 7.73 (d, J=2.0 Hz, 1H), 7.47 (dd, J=8.3, 2.0 Hz, 2H), 7.17 (d, 2H), 6.01 (s, 1H), 2.29 (d, J=1.9 Hz, 3H). $^{13}$C NMR (101 MHZ, DMSO-d$_6$) δ 176.97, 150.15, 137.11, 135.13, 129.60, 124.88, 102.22 94.87, 21.23. FTIR, cm$^{-1}$: 3374 (—NH$_2$), 3185 (—NH—), 3046 (C—H aromatic), 2980 (aliphatic C—H), 1573 (aromatic C=C), 1537 (aromatic C=N), 1250 (C=S), 1520 (C=C).

3-amino-N-(4-bromophenyl)-1H-pyrazole-1-carbothioamide (SB33)

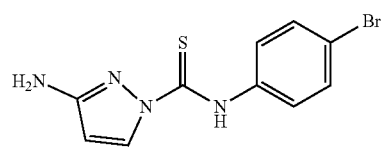

$^1$H NMR (400 MHZ, DMSO-d$_6$) δ 7.73 (d, J=3.1 Hz, 1H), 7.60 (d, 2H), 7.54 (d, 2H), 6.02 (s, 1H). $^{13}$C NMR (151 MHz, DMSO-d$_6$) δ 176.66, 149.72, 138.84, 131.78, 130.20, 126.53, 117.75, 94.80. FTIR, cm$^{-1}$: 3361, 3338 (—NH$_2$), 3176 (—NH—), 3047 (C—H aromatic), 2960, 2920 (CH pyrazole), 1581, (aromatic C=C), 1533 (aromatic C=N), 1264 (C=S), 701 (aromatic C—Br).

3-amino-N-(4-fluorophenyl)-1H-pyrazole-1-carbothioamide (SB37)

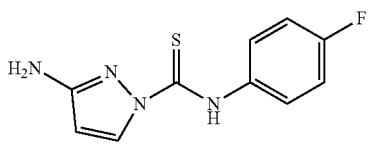

$^1$H NMR (400 MHZ, DMSO-d$_6$) δ 7.74 (s, 1H), 7.60 (dt, J=9.4, 4.8 Hz, 2H), 7.21 (td, J=8.9, 4.9 Hz, 2H), 6.02 (s, 1H). $^{13}$C NMR (151 MHz, DMSO-d$_6$) δ 177.22, 160.81, 149.81, 135.73 (d, J=2.9 Hz), 130.15, 127.18 (d, J=8.3 Hz), 115.61 (d, J=22.4 Hz), 94.70. FTIR, cm 1:3332 (—NH$_2$), 3166 (—NH—), 3062 (C—H aromatic), 1608 (aromatic C=C), 1579 (aromatic C=N), 1273 (C=S), 1184 (aromatic C—F).

Compound SB38

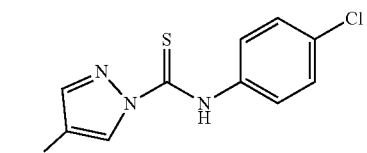

Binding constant (M$^{-1}$): <100 no binding observed. MIC (μM): NA.

Compound SB39

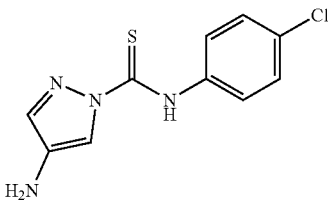 [SMILES: Nc1cnn(C(=S)Nc2ccc(Cl)cc2)c1]

Binding constant (M$^{-1}$): 2200. MIC (μM): NA.

N-(2,3-dichlorophenyl)-1H-pyrazole-1-carbothioamide (SB87)

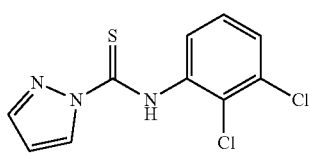

$^1$H NMR (400 MHZ, DMSO-d$_6$) δ 11.90 (s, 1H), 8.73 (d, J=2.8 Hz, 1H), 7.67 (ddd, J=11.7, 8.0, 1.6 Hz, 1H), 7.55

(ddd, J=8.0, 3.9, 1.6 Hz, 1H), 7.45 (dt, J=16.1, 8.1 Hz, 1H), 6.65 (dd, J=2.8, 1.6 Hz, 1H), 6.26 (t, J=2.0 Hz, 1H). $^{13}$C NMR (101 MHz, DMSO-d$_6$) δ 176.22, 144.29, 138.42, 133.00, 132.55, 132.48, 130.76, 130.49, 130.16, 130.01, 129.53, 129.38, 128.80, 126.52, 110.76, 104.66. FTIR, cm$^{-1}$: 3227 (—NH), 1521 (aromatic C=C), 1417 (—CH3), 1280 (aromatic C=N), 1182 (C=S), 750, 728 (aromatic C—Cl).

N-(2,4-dichlorophenyl)-1H-pyrazole-1-carbothioamide (SB88)

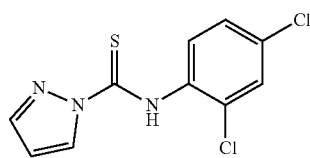

$^1$H NMR (400 MHz, DMSO-d$_6$) δ 8.72 (d, J=2.8 Hz, 1H), 7.86 (d, J=2.3 Hz, 1H), 7.79 (d, J=2.2 Hz, 1H), 7.53 (td, J=4.3, 3.8, 2.3 Hz, 1H), 6.65 (dd, J=2.8, 1.6 Hz, 1H), 6.26 (t, J=2.0 Hz, 1H). $^{13}$C NMR (101 MHz, DMSO-d$_6$) δ 176.16, 144.25, 133.18, 133.10, 132.44, 132.02, 131.72, 130.22, 129.75, 129.21, 128.84, 128.42, 128.10, 110.70, 104.65, 45.78, 44.42, 8.90. FTIR, cm$^{-1}$: 3271 (—NH), 1569 (aromatic C=C), 1468 (—CH3), 1289 (aromatic C=N), 1189 (C=S), 845, 747 (aromatic C—Cl).

N-(3,4-dichlorophenyl)-1H-pyrazole-1-carbothioamide (SB89)

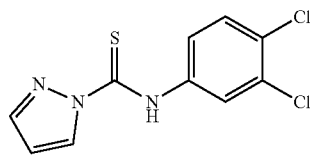

$^1$H NMR (400 MHZ, DMSO-d$_6$) δ 11.99 (s, 1H), 8.75 (dd, J=2.7, 0.7 Hz, 1H), 7.82 (d, J=2.4 Hz, 1H), 7.73-7.68 (m, 1H), 7.45 (dd, J=8.6, 2.4 Hz, 1H), 6.65 (dd, J=2.8, 1.6 Hz, 1H), 6.26 (t, J=2.0 Hz, 1H). $^{13}$C NMR (101 MHZ, DMSO-d$_6$) δ 175.07, 144.06, 138.62, 136.13, 132.53, 132.49, 132.02, 131.12, 130.96, 130.80, 130.65, 129.29, 128.33, 127.83, 126.86, 126.45, 110.82, 104.65. FTIR, cm$^{-1}$: 3226 (—NH), 1581 (aromatic C=C), 1467 (—CH3), 1218 (aromatic C=N), 1186 (C=S), 759, 726 (aromatic C—Cl).

N-(2,6-dichlorophenyl)-1H-pyrazole-1-carbothioamide (SB90)

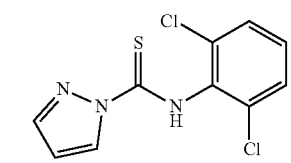

$^1$H NMR (400 MHZ, DMSO-d$_6$) δ 10.91 (s, 1H), 8.72 (d, J=2.6 Hz, 1H), 7.86 (d, J=1.5 Hz, 1H), 7.63 (d, J=8.2 Hz, 1H), 7.50 (d, J=8.1 Hz, 1H), 7.37 (s, 1H), 6.52 (dd, J=2.7, 1.6 Hz, 1H). $^{13}$C NMR (101 MHz, DMSO-d$_6$) δ 140.60, 131.68, 129.67, 129.46, 128.81, 128.78, 127.64, 104.65, 46.09, 9.26, 9.23. FTIR, cm$^{-1}$: 3184 (—NH), 1529 (aromatic C=C), 1435 (—CH3), 1243 (aromatic C=N), 1187 (C=S), 779, 763 (aromatic C—Cl).

3-amino-N-(2,3-dichlorophenyl)-1H-pyrazole-1-carbothioamide (SB91)

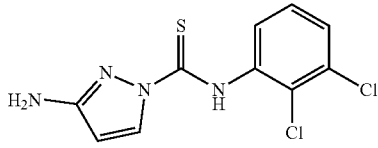

$^1$H NMR (400 MHZ, DMSO-d$_6$) δ 11.04 (s, 1H), 8.02-7.96 (m, 1H), 7.53 (dd, J=8.1, 1.5 Hz, 1H), 7.40 (s, 1H), 7.28-7.24 (m, 1H), 7.01 (t, J=8.0 Hz, 1H), 6.74 (ddd, J=7.8, 6.5, 1.5 Hz, 1H), 6.15-5.93 (m, 2H). $^{13}$C NMR (101 MHZ, DMSO-d$_6$) δ 177.58, 175.22, 153.78, 149.55, 147.21, 138.68, 132.05, 132.00, 130.24, 128.48, 128.12, 128.03, 127.92, 127.45, 117.20, 114.07, 91.05, 55.38. FTIR, cm$^{-1}$: 3404 (—NH$_2$), 3191 (—NH), 1530 (aromatic C=C), 1449 (—CH3), 1246 (aromatic C=N), 1187 (C=S), 732, 715 (aromatic C—Cl).

3-amino-N-(2,4-dichlorophenyl)-1H-pyrazole-1-carbothioamide (SB92)

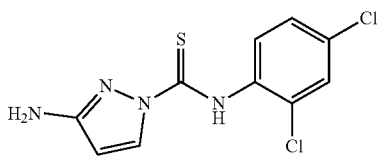

$^1$H NMR (400 MHZ, DMSO-d$_6$) δ 11.04 (s, 1H), 8.09 (d, J=8.8 Hz, 1H), 7.73 (dd, J=10.9, 2.5 Hz, 2H), 7.46 (dd, J=8.8, 2.5 Hz, 1H), 7.25 (s, 2H), 5.76 (s, 2H). $^{13}$C NMR (101 MHz, DMSO-d$_6$) δ 153.76, 149.51, 135.89, 131.60, 130.85, 130.18, 129.42, 129.13, 127.53, 91.01, 55.40, 45.78, 44.41, 8.89. FTIR, cm$^{-1}$: 3422 (—NH$_2$), 2937 (—NH), 1547 (aromatic C=C), 1473 (—CH3), 1247 (aromatic C=N), 1125 (C=S), 747, 660 (aromatic C—Cl).

3-amino-N-(3,4-dichlorophenyl)-1H-pyrazole-1-carbothioamide (SB93)

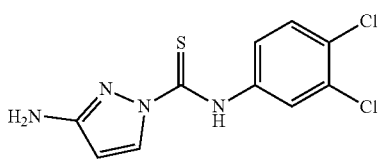

¹H NMR (400 MHz, DMSO-d₆) δ 10.92 (s, 1H), 8.15 (d, J=2.4 Hz, 1H), 7.57 (dd, J=8.7, 2.5 Hz, 1H), 7.26 (d, J=2.1 Hz, 1H), 7.18 (d, J=8.7 Hz, 1H), 6.74 (d, J=2.6 Hz, 1H), 6.52 (dd, J=8.7, 2.6 Hz, 1H), 5.38 (d, J=2.1 Hz, 2H). ¹³C NMR (101 MHz, DMSO-d₆) δ 176.72, 175.21, 153.76, 149.61, 149.54, 139.59, 131.00, 130.96, 130.73, 130.58, 130.24, 127.37, 125.84, 124.59, 116.45, 114.95, 114.51, 102.86, 91.06, 55.38. FTIR, cm⁻¹: 3157 (—NH₂), 2924 (—NH), 1568 (aromatic C═C), 1490 (—CH3), 1237 (aromatic C═N), 1187 (C═S), 748, 711 (aromatic C—Cl).

3-amino-N-(2,6-dichlorophenyl)-1H-pyrazole-1-carbothioamide (SB94)

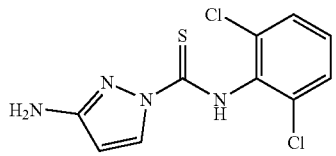

¹H NMR (400 MHZ, DMSO-d₆) δ 10.89 (s, 1H), 8.36 (d, J=3.0 Hz, 1H), 7.64 (d, J=8.3 Hz, OH), 7.56 (d, J=8.1 Hz, 3H), 7.43-7.37 (m, 1H), 5.98 (d, J=3.0 Hz, 1H), 5.72 (s, 2H). ¹³C NMR (101 MHz, DMSO-d₆) δ 174.89, 159.38, 134.98, 134.83, 133.17, 131.68, 130.24, 129.98, 129.69, 129.48, 128.94, 102.42. FTIR, cm⁻¹: 3157 (—NH₂), 2924 (—NH), 1568 (aromatic C═C), 1490 (—CH3), 1237 (aromatic C═N), 1187 (C═S), 748, 711 (aromatic C—Cl).

Synthesis Route B:

N-(2-chlorophenyl)-3-methyl-1H-pyrazole-1-carbothioamide (SB60)

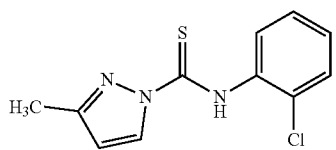

A solution of 3-methyl pyrazole (109 mg, 1.33 mmol), 2-chlorophenyl isothiocyanate (247 mg, 1.46 mmol, and dichloromethane (10 mL) was refluxed at 45° C. for 24 hours. The solvent was removed in vacuo, revealing a white solid (170 mg, 51%). ¹H NMR (400 MHZ, DMSO-d₆) δ 11.73 (s, 1H), 8.62 (d, J=2.7 Hz, 1H), 7.75 (t, J=2.1 Hz, 1H), 7.61-7.56 (m, 1H), 7.46-7.40 (m, 2H), 7.34 (ddd, J=8.1, 2.1, 1.0 Hz, 1H), 6.46 (d, J=2.7 Hz, 1H), 2.31 (s, 3H). ¹³C NMR (101 MHz, DMSO-d₆) δ 175.03, 153.70, 140.32, 133.23, 132.05, 130.73, 128.71, 127.11, 126.10, 125.12, 111.54, 104.30. FTIR, cm⁻¹: 3267 (—NH), 3153, 2925 (C—H aromatic), 1589 (aromatic C═C), 1482 (aromatic C═N), 1407 (—CH3), 1346 (C═S), 759 (aromatic C—Cl).

Methyl 1-((4-chlorophenyl) carbamothioyl)-1H-pyrazole-3-carboxylate (SB42)

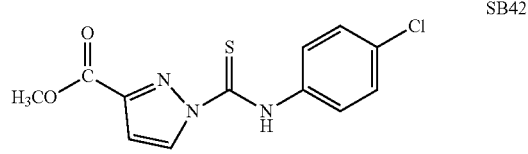 [SMILES: COC(=O)c1ccn(C(=S)Nc2ccc(Cl)cc2)n1]

¹H NMR (600 MHZ, DMSO-d₆) δ 9.99 (s, 1H), 7.88 (m, 1H), 7.51 (m, 2H), 7.40 (m, 2H), 6.76 (t, J=2.2 Hz, 1H), 3.79 (s, 3H). ¹³C NMR (151 MHz, DMSO-d₆) δ 179.93, 163.04, 143.11, 138.79, 130.57, 128.83, 128.28, 125.77, 107.92, 51.88.

N-(3-chlorophenyl)-3-methyl-1H-pyrazole-1-carbothioamide (SB61)

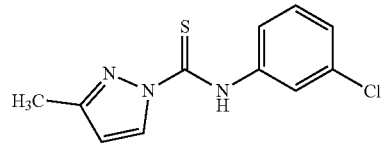

¹H NMR (400 MHZ, Chloroform-d) δ 9.59 (s, 1H), 7.48-7.44 (m, 2H), 7.42-7.39 (m, 1H), 7.27-7.24 (m, 1H), 6.39 (s, 2H), 5.44 (d, J=2.0 Hz, OH), 4.98 (d, J=6.0 Hz, 1H). ¹³C NMR (101 MHz, Chloroform-d) δ 176.89, 151.22, 141.12, 133.96, 130.59, 129.95, 129.60, 127.28, 90.18, 45.76. FTIR, cm⁻¹: 3402 (—NH), 3267, 3200 (C—H aromatic), 1596 (aromatic C═C), 1444 (aromatic C—N), 1393 (—CH3), 1334 (C═S), 739 (aromatic C—Cl).

4-amino-N-(2-chlorobenzyl)-1H-pyrazole-1-carbothioamide (SB62)

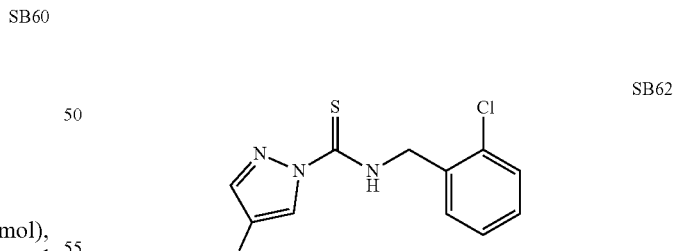

¹H NMR (400 MHz, Chloroform-d) δ 9.58 (s, 1H), 7.47-7.44 (m, 2H), 7.41-7.39 (m, 1H), 7.27-7.24 (m, 1H), 6.41-6.37 (m, 2H), 5.44 (d, J=2.0 Hz, 1H), 4.98 (d, J=6.0 Hz, 1H). ¹³C NMR (101 MHz, Chloroform-d) δ 176.89, 151.22, 141.12, 133.96, 130.59, 129.95, 129.60, 127.28, 90.18, 45.76. FTIR, cm⁻¹: 3413 (—NH), 3245, 3150 (C—H aromatic), 1600 (aromatic C═C), 1541 (aromatic C═N), 1308 (C═S), 775 (aromatic C—Cl).

N-(4-isothiocyanatophenyl)-3-methyl-1H-pyrazole-1-carbothioamide (SB82)

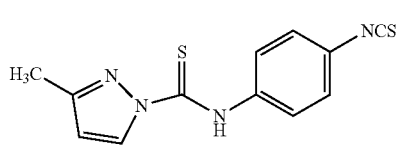

$^1$H NMR (400 MHZ, DMSO-d$_6$) δ 11.81 (s, 1H), 8.64 (d, J=2.8 Hz, 1H), 7.68 (d, J=13.6 Hz, 2H), 7.48 (d, J=7.7 Hz, 2H), 6.47 (d, J=10.9 Hz, 1H), 2.32 (d, J=3.0 Hz, 3H). $^{13}$C NMR (101 MHz, DMSO-d$_6$) δ 174.54, 139.41, 135.19, 133.00, 129.64, 128.02, 127.29, 126.93, 126.67, 126.54, 126.07, 125.92, 124.63, 124.52, 111.32, 104.10, 14.11. FTIR, cm$^{-1}$: 3349 (—NH$_2$), 3143, 3121, (—NH), 1513 (aromatic C=C), 1290 (aromatic C=N), 1214 (C=S), 764 (aromatic C—Cl).

Synthesis Route C:

N-(4-chlorophenyl)-3-oxo-2,3-dihydro-1H-pyrazole-1-carbothioamide (SB43)

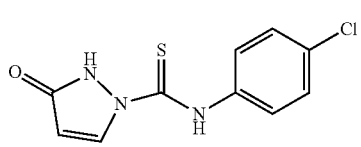

A solution of 1,2-dihydro-3H-pyrazol-3-one (50 mg, 0.0595 mmol), 4-chlorophenyl isothiocyanate (111 mg, 0.655 mmol), and tetrahydrofuran (10 mL) was refluxed at 45° C. under argon for 24 hours. The solvent was removed in vacuo. Descending column chromatography using silica gel as stationary phase and a gradient mixture of DCM and MeOH as eluent gave a white solid (186 mg, 62%). $^1$H NMR (400 MHZ, Chloroform-d) δ 10.06 (s, 1H), 8.55 (d, J=2.8 Hz, 1H), 7.67 (d, J=8.2 Hz, 2H), 7.38 (d, J=8.1 Hz, 2H), 6.00 (d, J=2.9 Hz, 1H). $^{13}$C NMR (101 MHZ, Chloroform-d) δ 162.87, 133.67, 129.34, 125.28, 99.03, 29.95. FTIR, cm$^{-1}$: 3322 (—NH—), 3052, 2976 (C—H aromatic), 1574 (C—O), 1491 (aromatic C=N), 1294 (C=S), 731 (aromatic C—Cl).

Synthesis Route D:

Synthesis of compounds SB34, SB35, and SB40 followed an isothiocyanate click-reaction with a heterocycle, e.g.:

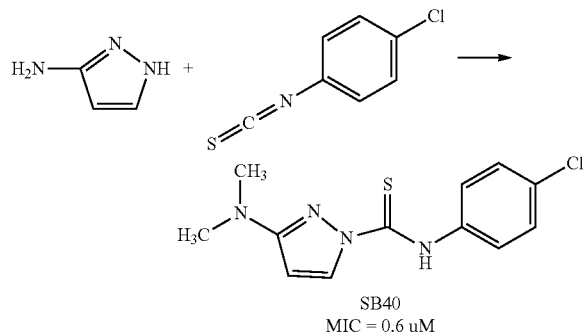

SB40
MIC = 0.6 uM

3-(benzyloxy)-N-(4-chlorophenyl)-1H-pyrazole-1-carbothioamide (Compound SB44)

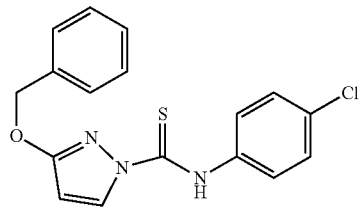

3-(benzyloxy)-1H-pyrazole (17) (400 mg, 2.30 mmol) was dissolved in dry THF and transferred in to a round bottom which consisted of K$_2$CO$_3$ (317.8 mg, 2.30 mmol). The reaction mixture was stirred vigorously for 1 h at 50° C. Then 4-chlorophenyl isothiocyanate (390 mg, 2.30 mmol) was added and refluxed at 70° C. for 18 h. The reaction was monitored by TLC (25% EtOAc/hexanes). Potassium carbonate solid was filtered off by gravity filtration and filtrate's THF was evaporated in vacuo. Resulting crude product was purified by flash column chromatography (100% hexane to 5% ethyl acetate/hexane) to afford 49% yield of SB44, off-white color solid. $^1$H NMR (600 MHZ, Chloroform-d) δ 10.24 (s, N—H), 8.61 (t, J=3.3 Hz, 1H), 7.73 (dd, J=8.7, 3.2 Hz, 2H), 7.49 (dd, J=7.9, 2.9 Hz, 2H), 7.42 (dddd, J=15.0, 13.0, 8.4, 4.5 Hz, 5H), 6.07 (t, J=3.3 Hz, 1H), 5.33 (d, J=3.2 Hz, 2H). $^{13}$C NMR (151 MHz, Chloroform-d) δ 173.04, 164.78, 135.83 (d, J=8.7 Hz), 133.02, 132.08, 129.12, 128.71, 128.54, 127.99, 125.25, 99.46, 71.37.

N-(4-chlorophenyl)-3,5-dimethyl-1H-pyrazole-1-carbothioamide (Compound SB34)

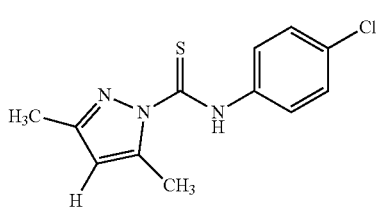

To a solution of 100 mg (1.04 mmol, 1 equiv.) of compound 1-2 in 10 mL of distilled THF at 0° C. under argon, a suspension of 38 mg (1.56 mmol, 1.5 equiv.) NaH in 10 mL of distilled THF was slowly added. The resulting reaction mixture was kept stirring under argon at RT for 3 h. Then 194 mg (1.15 mmol, 1.1 equiv.) 4-chlorophenyl isothiocyanate was added, followed by overnight stirring at RT under argon. The reaction residue was concentrated to dryness and crystallized using anhydrous diethyl ether to give 120 mg (yield 43%) compound SB34 as a yellow solid. $^1$H NMR (400 MHZ, DMSO-d$_6$) δ 7.21 (d, J=8.3 Hz, 2H), 7.04 (d, J=8.3 Hz, 2H), 5.79 (s, 1H), 3.39 (bs, 1H), 2.40 (s, 3H), 2.12 (s, 3H). $^{13}$C NMR (101 MHZ, DMSO-d$_6$) δ 170.68, 152.01, 144.34, 138.10, 127.56, 124.28, 124.22, 105.66, 14.11, 13.45.

N-(4-chlorophenyl)-3,4,5-trimethyl-1H-pyrazole-1-carbothioamide (Compound SB35)

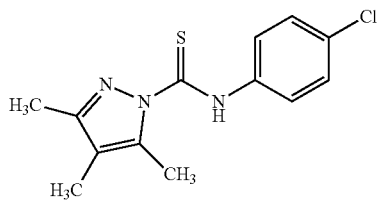

¹H NMR (400 MHZ, DMSO-d$_6$) δ 7.20 (d, J=8.6 Hz, 2H), 7.03 (d, J=8.6 Hz, 2H), 4.38 (bs, 1H), 2.33 (s, 3H), 2.06 (s, 3H), 1.85 (s, 3H). ¹³C NMR (101 MHZ, DMSO-d$_6$) δ 170.95, 152.13, 143.56, 134.68, 127.52, 124.23, 124.13, 110.92, 12.40, 11.79, 7.85.

N-(4-chlorophenyl)-3-(dimethylamino)-1H-pyrazole-1-carbothioamide (Compound SB40)

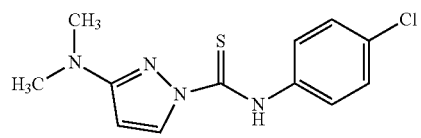

¹H NMR (400 MHZ, DMSO-d$_6$) δ 8.63 (d, J=2.7 Hz, 1H), 8.49 (s, 1H), 7.15 (d, J=8.6 Hz, 2H), 6.87 (d, J=8.6 Hz, 2H), 5.74 (d, J=2.7 Hz, 1H), 2.76 (s, 6H).

Synthesis Route E:

N-(3-chlorophenyl)-4-nitro-1H-pyrazole-1-carbothioamide (Compound SB59)

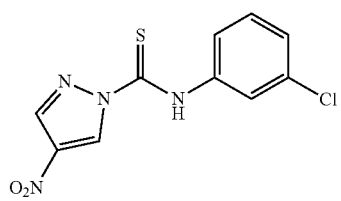

Two 100 mL round bottom flasks were flame dried to remove moisture. To flask A was added 4-nitro pyrazole (50 mg, 0.442 mmol) and dry THF (10 mL). To flask B was added sodium hydride (15.9 mg, 0.663 mmol) and dry THF (10 mL). Both flasks were allowed to stir at 0° C. for 20 minutes. The mixture from flask B was cannulated into flask A using a two-headed needle. This solution was kept stirring at r.t. under argon for 3 hours. 3-chlorophenyl isothiocyanate (82 mg, 0.486 mmol) was added to the reaction, which continued stirring for 12 hours at r.t. The reaction was concentrated to dryness to reveal a white solid (100 mg, 80%). ¹H NMR (400 MHZ, DMSO-d$_6$) δ 10.09 (s, 1H), 7.68-7.65 (m, 1H), 7.40-7.31 (m, 2H), 7.17 (dddd, J=7.6, 2.1, 1.4, 0.7 Hz, 1H), 5.73 (d, J=0.8 Hz, 1H). ¹³C NMR (101 MHZ, DMSO-d$_6$) δ 180.36, 141.52, 133.28, 130.76, 124.92, 123.76, 122.71, 55.58, 31.37. FTIR, cm⁻¹: 3210 (—NH), 3118, 3095 (C—H aromatic), 1584 (aromatic C═C), 1441 (aromatic C═N), 1303 (C═S), 735 (aromatic C—Cl).

N-(4-chlorophenyl)-3-methyl-4-nitro-1H-pyrazole-1-carbothioamide (Compound SB47)

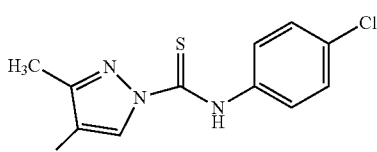

¹H NMR (600 MHZ, DMSO-d$_6$) δ 9.95 (s, 1H), 7.50 (d, J=8.8 Hz, 2H), 7.40 (d, J=8.8 Hz, 2H), 3.35 (s, 3H). ¹³C NMR (151 MHz, DMSO-d$_6$) δ 175.25, 161.80, 138.76, 128.83, 125.80, 24.97.

N-(4-chlorophenyl)-3-((4-nitrobenzyl)oxy)-1H-pyrazole-1-carbothioamide (Compound SB63)

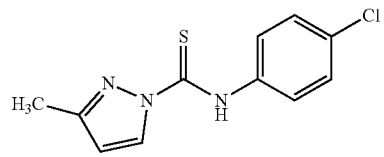 [SMILES: Cc1ccn(C(=S)Nc2ccc(Cl)cc2)n1]

¹H NMR (600 MHz, DMSO-d$_6$) δ 11.43 (s, 3H), 8.63 (d, J=3.0 Hz, 2H), 8.29 (d, J=8.7 Hz, 4H), 7.78 (d, J=8.8 Hz, 4H), 7.64 (d, J=8.7 Hz, 4H), 7.54-7.50 (m, 4H), 6.36 (d, J=3.0 Hz, 3H), 5.57 (s, 5H), 3.67 (s, 1H). ¹³C NMR (151 MHZ, DMSO-d$_6$) δ 174.40, 164.67, 147.69, 144.49, 137.53, 134.26, 131.28, 129.25, 128.97, 128.20, 124.16, 99.39, 69.88. MIC (μM): >10.

Compound SB17

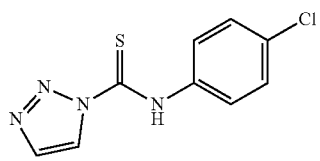 [SMILES: S=C(Nc1ccc(Cl)cc1)n1ccnn1]

Binding constant (M⁻¹): 54020

Compound SB18

Binding constant (M⁻¹): <1000

N-(4-chlorophenyl)-1H-pyrazole-1-carbothioamide (Compound SB19)

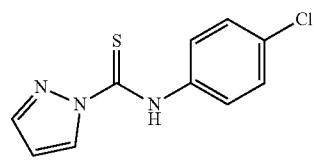

¹H NMR (400 MHZ, DMSO-d₆) δ 8.77 (s, J=2.6 Hz, 1H), 7.48 (d, 1H), 7.21 (d, 2H), 7.04 (d, 2H), 6.26 (s, J=1.9 Hz, 1H). ¹³C NMR (151 MHz, DMSO-d₆) δ 169.00, 162.79, 152.47, 140.03, 130.88, 127.91, 125.19, 105.34. FTIR, cm⁻¹: 3453 (—NH—), 3250 (C—H aromatic), 1645 (aromatic C═C), 1538 (aromatic C═N), 1236 (C═S), 762 (aromatic C—Cl). Binding constant (M⁻¹): 2100. MIC (μM): 5.

Compound SB20

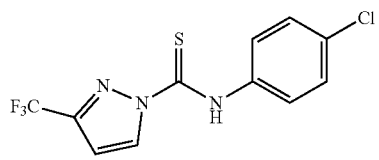 [SMILES: FC(F)(F)c1ccn(C(=S)Nc2ccc(Cl)cc2)n1]

Binding constant (M⁻¹): <1000.

Compound SB21

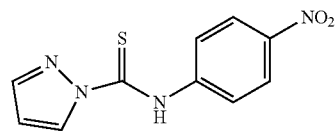 [SMILES: O=[N+]([O-])c1ccc(NC(=S)n2cccn2)cc1]

Binding constant (M⁻¹): 26063. MIC (μM): 10.

N-(4-fluorophenyl)-1H-pyrazole-1-carbothioamide (Compound SB23)

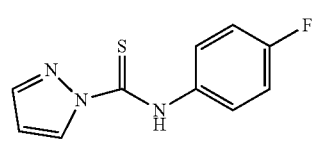

¹H NMR (400 MHZ, DMSO-d₆) δ 8.74 (s, 1H), 7.98 (s, 1H), 7.63 (d, 2H), 7.50 (d, 1H), 7.28 (d, J=9.2 Hz, 2H), 6.63 (s, 1H). ¹³C NMR (101 MHz, DMSO-d₆) δ 175.46, 144.06, 132.66, 128.91, 117.70, 116.09, 110.72, 104.89. FTIR, cm⁻¹: 3245 (—NH—), 3150 (C—H aromatic), 1608 (aromatic C═C), 1548 (aromatic C═N), 1291 (C═S), 1215 (aromatic C—F).

N-(4-chlorophenyl)-4-nitro-1H-pyrazole-1-carbothioamide (Compound SB30)

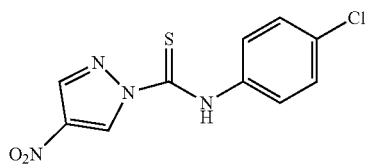

¹H NMR (400 MHZ, DMSO-d₆) δ 9.46 (d, J=3.6 Hz, N—H), 8.24 (s, J=3.7 Hz, 1H), 7.98 (s, J=3.7 Hz, 1H), 7.25 (dd, J=8.8, 3.6 Hz, 2H), 7.12 (dd, J=8.7, 3.6 Hz, 2H). ¹³C NMR (151 MHz, DMSO-d₆) δ 166.68, 151.46, 136.64, 135.49, 129.15, 128.18, 125.56, 124.68. FTIR, cm⁻¹: 3388 (—NH—), 3100 (C—H aromatic), 1652 (aromatic C═C), (aromatic C═N), 1254 (C═S), 760 (aromatic C—Cl), 1479 and 1275 (N═O). Binding constant (M⁻¹): 1100.

N-(4-isothiocyanatophenyl)-4-nitro-1H-pyrazole-1-carbothioamide (Compound SB83)

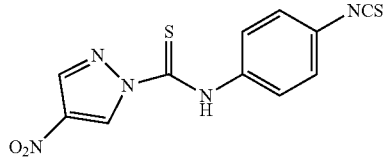

¹H NMR (400 MHZ, DMSO-d₆) δ 9.97 (s, 1H), 8.03 (d, J=8.9 Hz, 1H), 7.78 (d, J=8.4 Hz, 2H), 2 7.36 (s, 2H), 7.15 (s, 1H). ¹³C NMR (101 MHZ, DMSO-d₆) δ 167.46, 136.36, 135.49, 133.80, 132.17, 132.08, 129.14, 125.74, 124.18, 123.71, 122.11, 67.87, 38.54, 30.89, 30.26, 28.83, 23.71, 23.48, 22.87, 14.37, 11.27. FTIR, cm⁻¹: 3390 (—NH), 3241, 2919 (C—H aromatic), 2059 (—NCS), 1477 (aromatic C═C), 1416 (—CH3), 1271 (aromatic C═N), 1148 (C═S), 735 (aromatic C—Cl)

Synthesis Route F:

N-(4-chlorophenyl)-3-(3-(4-chlorophenyl)-1-methylthioureido)-1H-pyrazole-1-carbothioamide (Compound SB45)

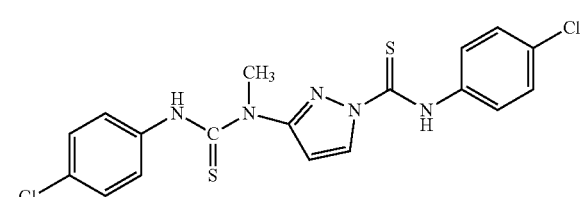

To a solution of N-methyl-1H-pyrazol-3-amine (55 mg, 0.61 mmol) and 4-chlorophenyl isothiocyanate (115 mg, 0.67 mmol) in anhydrous DMF (2 mL), anhydrous potassium carbonate (168 mg, 1.22 mmol) was added. The reaction mixture was kept stirring under argon at room temperature for 24 hours. This was filtered to remove excess K$_2$CO$_3$ and the filtrate concentrated to dryness. Descending column chromatography using silica gel as stationary phase and a gradient of DCM and MeOH as eluent gave a light yellow solid (47 mg, 18%). $^1$H NMR (400 MHZ, Chloroform-d) δ 10.12 (s, 1H), 9.94 (s, 1H), 8.81 (d, J=3.0 Hz, 1H), 7.64 (d, J=8.8 Hz, 1H), 7.43-7.40 (m, 2H), 7.35-7.33 (m, 1H), 6.43 (d, J=3.0 Hz, 1H), 3.85 (s, 2H). $^{13}$C NMR (101 MHz, Chloroform-d) δ 147.50, 145.27, 130.60, 129.07, 128.52, 127.61, 126.02, 114.94, 103.64. IR

N-(2-chlorophenyl)-3-(3-(2-chlorophenyl)thioureido)-1H-pyrazole-1-carbothioamide (Compound SB53)

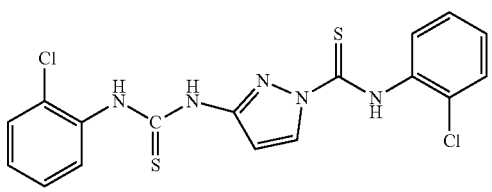

$^1$H NMR (400 MHZ, Chloroform-d) δ 10.65 (s, 1H), 8.60 (dd, J=8.2, 1.6 Hz, 1H), 8.53 (dd, J=3.0, 0.5 Hz, 1H), 7.46 (dd, J=8.0, 1.5 Hz, 2H), 7.35 (ddd, J=8.2, 7.5, 1.5 Hz, 2H), 7.20 (td, J=7.7, 1.6 Hz, 2H), 5.94 (dd, J=3.0, 0.6 Hz, 1H). $^{13}$C NMR (101 MHz, Chloroform-d) δ 157.03, 133.08, 129.72, 127.49, 127.23, 127.17, 125.24, 101.28, 77.45. FTIR, cm$^{-1}$: 3420, 3327, 3199 (—NH—), 1584 (aromatic C═C), 1529 (aromatic C═N), 1239 (C═S), 744 (aromatic C—Cl).

N-(3-chlorophenyl)-3-(3-(3-chlorophenyl)-1-methylthioureido)-1H-pyrazole-1-carbothioamide (Compound SB54)

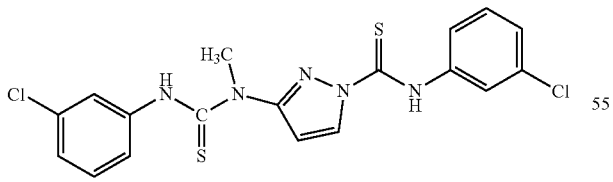

$^1$H NMR (400 MHZ, DMSO-d$_6$) δ 11.73 (s, 1H), 10.51 (s, 1H), 8.75 (dt, J=3.1, 1.6 Hz, 1H), 7.71 (q, J=1.8 Hz, 1H), 7.57 (dq, J=5.6, 1.7 Hz, 2H), 7.48 (td, J=8.0, 1.4 Hz, 2H), 7.40-7.35 (m, 2H), 7.22 (dt, J=7.8, 1.7 Hz, 2H), 6.74-6.70 (m, 1H), 3.72 (d, J=1.5 Hz, 3H). $^{13}$C NMR (101 MHz, DMSO-d$_6$) δ 182.07, 174.70, 155.14, 142.35, 140.17, 133.84, 133.37, 132.98, 132.06, 130.95, 130.47, 128.72, 127.54, 126.50, 126.03, 125.75, 125.47, 124.86, 106.24. FTIR, cm$^{-1}$: 3309, 3060 (—NH—), 1589 (aromatic C═C), 1522 (aromatic C═N), 1427 (—CH3), 1290 (C═S), 758 (aromatic C—Cl).

N-(2-chlorophenyl)-3-(3-(2-chlorophenyl)-1-methylthioureido)-1H-pyrazole-1-carbothioamide (Compound SB55)

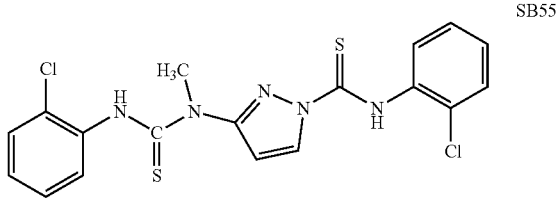 [SMILES: CN(C(=S)Nc1ccccc1Cl)c1ccn(C(=S)Nc2ccccc2Cl)n1]

$^1$H NMR (400 MHZ, DMSO-d$_6$) δ 11.47 (s, 1H), 9.64 (s, 1H), 7.88 (s 1H), 7.51-7.47 (m, 4H), 7.34-7.31 (m, 2H), 7.26-7.23 (m, 2H), 6.31 (t, J=2.2 Hz, 1H), 3.71 (s, 3H). $^{13}$C NMR (101 MHz, DMSO-d$_6$) δ 131.12, 130.50, 130.41, 130.15, 129.92, 129.76, 129.27, 128.38, 128.31, 127.98, 127.88, 127.71, 97.75, 55.60, 41.44. FTIR, cm$^{-1}$: 3350 (—NH), 3049, 2947 (C—H aromatic), 1704 (aromatic C═C), 1600 (aromatic C═N), 1433 (—CH3), 1350 (C═S), 730 (aromatic C—Cl).

N-(2-chlorophenyl)-4-nitro-1H-pyrazole-1-carbothioamide (Compound SB56)

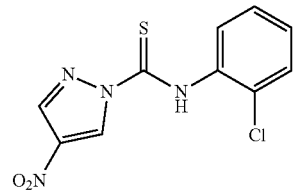

$^1$H NMR (400 MHZ, Chloroform-d) δ 11.01 (s, 1H), 8.57 (dd, J=8.2, 1.6 Hz, 1H), 7.48 (dd, J=8.0, 1.5 Hz, 1H), 7.44-7.41 (m, 1H), 7.36 (td, J=7.8, 1.5 Hz, 1H), 7.25-7.19 (m, 1H), 6.28 (d, J=2.8 Hz, 1H). $^{13}$C NMR (101 MHZ, Chloroform-d) δ 176.62, 168.38, 154.70, 146.78, 48.96. FTIR, cm$^{-1}$: 3112 (—NH), 2931, 2873 (C—H aromatic), 1677 (aromatic C═C), 1501 (aromatic C═N), 1311 (C═S), 735 (aromatic C—Cl).

N-(3-chlorophenyl)-3-(3-(3-chlorophenyl)thioureido)-1H-pyrazole-1-carbothioamide (Compound SB57)

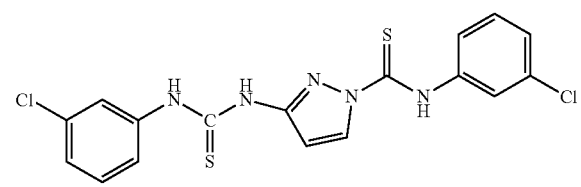

$^1$H NMR (400 MHZ, Chloroform-d) δ 10.28 (s, 1H), 8.52 (d, J=3.0 Hz, 1H), 7.88 (t, J=2.0 Hz, 2H), 7.64 (dd, J=8.1, 1.9 Hz, 2H), 7.34 (t, J=8.1 Hz, 2H), 7.25-7.20 (m, 2H), 5.93 (d, J=2.9 Hz, 1H). $^{13}$C NMR (101 MHz, Chloroform-d) δ 133.08, 130.05, 126.67, 123.69, 121.80, 101.20. FTIR, cm$^{-1}$: 3431, 3330, 3154 (—NH—), 1661 (aromatic C=C), 1580 (aromatic C=N), 1288 (C=S), 754 (aromatic C—Cl).

(1-((4-chlorophenyl) carbamothioyl)-1H-pyrazole-3-carbonyl)threonyllysylprolyllysylglycine (Compound SB58)

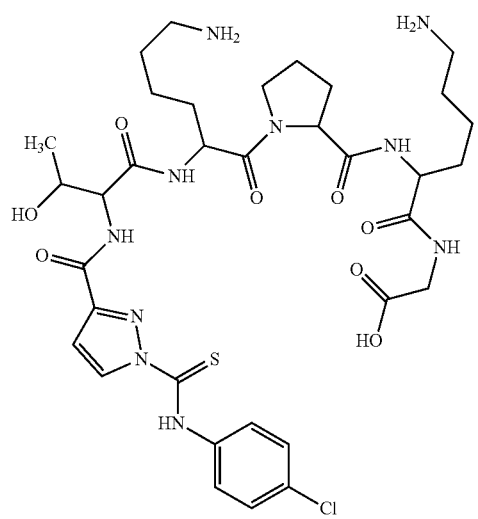

$^1$H NMR (600 MHZ, DMSO-d$_6$) δ 8.31 (d, J=4.9 Hz, 1H), 7.83 (d, J=4.7 Hz, 5H), 7.67-7.52 (m, 7H), 7.27 (s, 50H), 6.71-6.56 (m, 6H), 4.39 (t, J=7.0 Hz, 352H), 3.64 (s, 7H), 3.47 (d, J=4.7 Hz, 6H), 3.35 (d, J=17.8 Hz, 30H), 3.23-3.12 (m, 4H), 2.86 (d, J=4.8 Hz, 15H), 2.70 (d, J=5.1 Hz, 14H), 2.51 (d, J=4.6 Hz, 24H), 2.07 (s, 7H), 1.81 (s, 10H), 1.68 (d, J=9.6 Hz, 6H), 1.46 (s, 23H), 1.38-1.22 (m, 58H), 1.06 (d, J=5.9 Hz, 13H). $^{13}$C NMR (151 MHz, DMSO-d$_6$) δ 164.03, 160.63, 146.11, 117.91, 115.95, 113.99, 128.82, 79.16, 67.35, 53.02, 43.53, 36.72, 31.49, 20.00. IR

3-(benzyloxy)-N-(2-chlorophenyl)-1H-pyrazole-1-carbothioamide (Compound SB64)

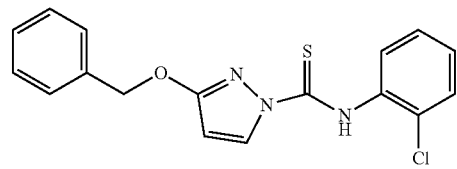

$^1$H NMR (400 MHZ, DMSO-d$_6$) δ 11.30 (s, 1H), 8.56 (d, J=3.0 Hz, 1H), 7.59 (ddd, J=7.4, 5.5, 1.8 Hz, 2H), 7.53-7.50 (m, 2H), 7.39 (dddd, J=15.0, 11.6, 8.4, 6.4 Hz, 4H), 6.28 (d, J=3.0 Hz, 1H), 5.36 (s, 2H). $^{13}$C NMR (101 MHz, DMSO-d$_6$) δ 175.26, 165.05, 136.71, 136.30, 134.03, 131.39, 130.34, 130.15, 129.56, 128.93, 128.76, 128.16, 99.60, 71.20. FTIR, cm$^{-1}$: 3401 (—NH), 3265, 3200 (C—H aromatic), 1596 (aromatic C=C), 1513 (aromatic C=N), 1300 (C=S), 1089 (aliphatic ether), 738 (aromatic C—Cl).

3-(benzyloxy)-N-(3-chlorophenyl)-1H-pyrazole-1-carbothioamide (Compound SB65)

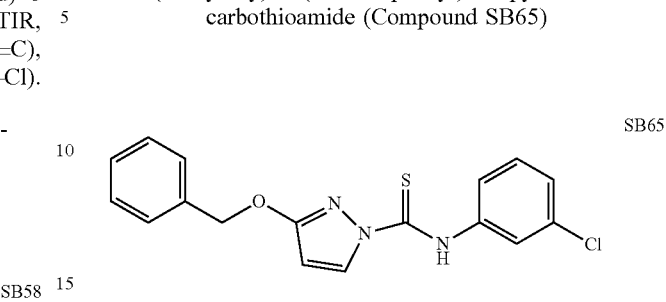

$^1$H NMR (400 MHZ, DMSO-d$_6$) δ 8.64 (t, J=2.6 Hz, 1H), 7.46-7.28 (m, 5H), 7.15 (t, J=7.9 Hz, 1H), 7.08-7.01 (m, 1H), 6.82-6.69 (m, 3H), 5.75 (d, J=2.6 Hz, 1H), 5.18 (s, 3H). $^{13}$C NMR (101 MHz, DMSO-d$_6$) δ 163.24, 137.74, 132.61, 132.40, 129.67, 128.97, 128.80, 128.29, 124.70, 122.91, 122.29, 120.64, 92.41, 70.20. FTIR, cm$^{-1}$: 3314 (—NH), 3204 (C—H aromatic), 1590 (aromatic C=C), 1546 (aromatic C=N), 1372 (C=S), 1092 (aliphatic ether), 756 (aromatic C—Cl).

1-((2-chlorophenyl) carbamothioyl)-1H-pyrazole-3-carboxylic acid (Compound SB66)

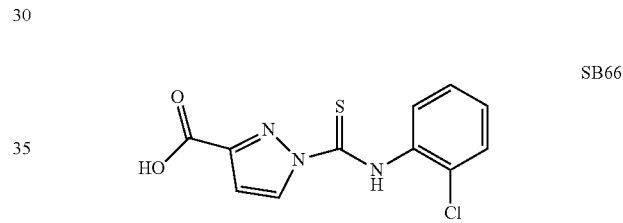

$^1$H NMR (400 MHZ, DMSO-d$_6$) δ 10.81 (s, 1H), 8.37 (d, J=3.0 Hz, 1H), 7.77-7.72 (m, 1H), 7.55 (dd, J=8.0, 1.6 Hz, 1H), 7.42-7.28 (m, 2H), 5.96 (d, J=3.0 Hz, 1H). $^{13}$C NMR (101 MHZ, DMSO-d$_6$) δ 173.97, 159.25, 149.66, 136.19, 133.06, 130.31, 130.18, 129.96, 129.71, 129.37, 129.07, 128.80, 128.33, 127.89, 127.65, 127.39, 102.57. FTIR, cm$^{-1}$: 3338 (—NH), 3200 (carboxylic acid), 1563 (aromatic C=C), 1583 (aromatic C=N), 1388 (C=S), 745 (aromatic C—Cl).

1-((3-chlorophenyl) carbamothioyl)-1H-pyrazole-3-carboxylic acid (Compound SB67)

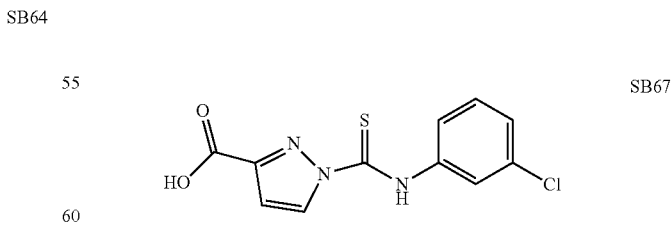

$^1$H NMR (400 MHZ, DMSO-d$_6$) δ 10.07 (s, 1H), 7.97 (d, J=7.7 Hz, OH), 7.67 (t, J=2.0 Hz, 1H), 7.42-7.33 (m, 2H), 7.20 (dt, J=7.1, 2.0 Hz, 1H). $^{13}$C NMR (101 MHz, DMSO-d$_6$) δ 180.17, 162.79, 141.30, 133.67, 133.06, 130.90, 130.59, 124.73, 123.59, 122.55, 122.19, 118.22, 117.31, 36.26, 31.24. FTIR, cm$^{-1}$: 3180 (—NH), 3160 (carboxylic acid), 1583 (aromatic C=C), 1532 (aromatic C=N), 1304 (C=S), 773 (aromatic C—Cl).

4-bromo-N-(4-chlorophenyl)-1H-pyrazole-1-carbothioamide (Compound SB68)

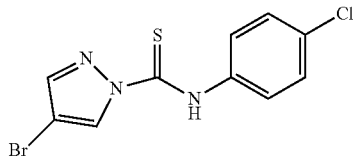

$^1$H NMR (600 MHz, DMSO-$d_6$) δ 12.00 (s, 1H), 8.93 (s, 1H), 8.17 (s, 1H), 7.99 (s, OH), 7.66 (d, J=8.3 Hz, 2H), 7.51 (d, J=8.8 Hz, 2H). $^{13}$C NMR (151 MHZ, DMSO-$d_6$) δ 173.89, 144.00, 139.47, 137.40, 132.10, 131.43, 130.38, 129.03, 128.28, 127.89, 98.45. MIC (μM): 10.

Ethyl 1-((2-chlorophenyl) carbamothioyl)-1H-pyrazole-3-carboxylate (Compound SB69)

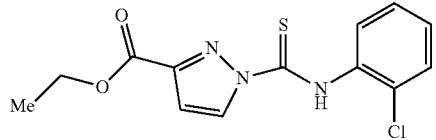

$^1$H NMR (400 MHZ, DMSO-$d_6$) δ 8.75 (s, 1H), 7.55 (dd, J=18.1, 8.0 Hz, 1H), 7.47-7.38 (m, 3H), 6.74 (s, 1H), 4.34-4.21 (m, 2H), 1.30 (d, J=7.0 Hz, 3H). $^{13}$C NMR (101 MHZ, DMSO-$d_6$) δ 181.80, 162.61, 143.39, 136.63, 130.64, 130.48, 130.28, 130.19, 129.93, 129.71, 129.06, 128.09, 127.76, 127.67, 107.87, 60.44, 14.70. FTIR, cm$^{-1}$: 3243 (—NH), 3127, 2990 (C—H aromatic), 1697 (C=O), 1581 (aromatic C=C), 1516 (aromatic C=N), 1463 (—CH3), 1396 (C=S), 758 (aromatic C—Cl)

Ethyl 1-((3-chlorophenyl) carbamothioyl)-1H-pyrazole-3-carboxylate (Compound SB70)

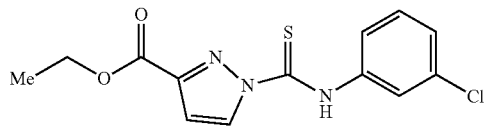

$^1$H NMR (400 MHZ, DMSO-$d_6$) δ 12.12 (s, 1H), 8.83 (d, J=2.8 Hz, 1H), 7.63 (d, J=2.1 Hz, 1H), 7.47 (d, J=1.5 Hz, 3H), 7.01 (d, J=2.7 Hz, 1H), 4.37 (d, J=7.1 Hz, 2H), 1.34 (t, J=7.1 Hz, 3H). $^{13}$C NMR (101 MHZ, DMSO-$d_6$) δ 180.16, 162.76, 141.30, 134.35, 133.06, 131.83, 130.55, 128.49, 126.24, 125.37, 123.55, 122.50. FTIR, cm$^{-1}$: 3246 (—NH), 3128, 2984 (C—H aromatic), 1724 (C=O), 1636 (aromatic C=C), 1534 (aromatic C=N), 1410 (—CH3), 1302 (C=S), 765 (aromatic C—Cl).

N-(2,6-dimethylphenyl)-1H-pyrazole-1-carbothioamide (Compound SB71)

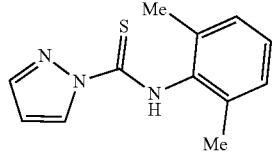

$^1$H NMR (600 MHZ, DMSO-$d_6$) δ 11.60 (s, OH), 8.73 (dd, J=2.8, 0.7 Hz, OH), 7.98 (dd, J=1.6, 0.7 Hz, OH), 7.18 (q, J=3.0 Hz, OH), 7.15 (s, OH), 7.14-7.13 (m, OH), 6.62 (dd, J=2.8, 1.6 Hz, 0H), 6.26 (t, J=2.0 Hz, OH), 2.34 (s, 1H), 2.16 (s, 1H). $^{13}$C NMR (151 MHZ, DMSO-$d_6$) δ 175.36, 143.98, 136.76, 135.73, 135.19, 132.26, 128.64, 128.43, 128.09, 110.15, 104.67, 18.64, 18.09. MIC (μM): 0.6.

N-(2,6-dimethylphenyl)-3-methyl-1H-pyrazole-1-carbothioamide (Compound SB72)

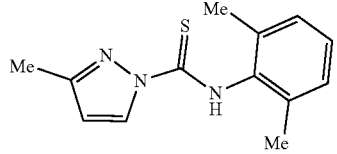

$^1$H NMR (400 MHZ, DMSO-$d_6$) δ 11.42 (s, 1H), 8.62 (d, J=2.7 Hz, 1H), 7.13 (s, 1H), 7.13-7.11 (m, 1H), 6.45 (d, J=2.8 Hz, 1H), 2.33 (s, 3H), 2.15 (s, 3H). $^{13}$C NMR (101 MHZ, DMSO-$d_6$) δ 175.21, 153.42, 136.85, 135.78, 132.87, 128.37, 127.97, 110.69, 18.13, 14.16. MIC (μM): 0.6.

Methyl 1-((3-chlorophenyl) carbamothioyl)-1H-pyrazole-3-carboxylate (Compound SB74)

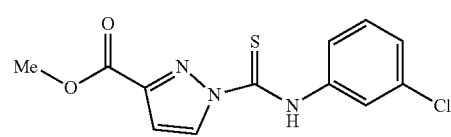

$^1$H NMR (400 MHZ, DMSO-$d_6$) δ 7.87 (s, 1H), 7.66-7.60 (m, 1H), 7.52-7.31 (m, 3H), 6.76 (s, 1H), 3.80 (s, 3H). $^{13}$C NMR (101 MHZ, DMSO-$d_6$) δ 180.17, 163.04, 143.12, 134.34, 131.85, 130.56 (d, J=4.0 Hz), 128.51, 126.27, 125.40, 124.73, 123.58, 122.54, 107.91. FTIR, cm$^{-1}$: 3446 (—NH), 3154, 3121 (C—H aromatic), 1717 (C=O), 1584 (aromatic C=C), 1363 (aromatic C=N), 1260 (C=S), 754 (aromatic C—Cl).

N-(2-chlorophenyl)-3-methyl-5-phenyl-1H-pyrazole-1-carbothioamide (Compound SB75)

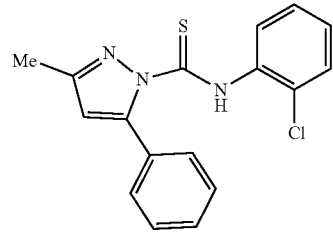

¹H NMR (600 MHZ, DMSO-d$_6$) δ 12.54 (s, 1H), 7.74 (d, J=7.5 Hz, 2H), 7.44-7.35 (m, 2H), 7.28 2 (t, J=7.9 Hz, 1H), 7.17 (dd, J=7.9, 1.5 Hz, 1H), 7.04-6.98 (m, 1H), 6.78 (dd, J=8.0, 1.5 Hz, 1H), 6.53 (td, J=7.5, 1.5 Hz, 1H), 6.44 (s, OH), 2.25 (s, 3H). ¹³C NMR (101 MHZ, DMSO-d$_6$) δ 130.21, 129.94, 129.43, 129.13, 128.12, 127.67, 126.01, 125.40, 117.24, 115.87. FTIR, cm-1:3320 (—NH), 3059 (C—H aromatic), 1571 (aromatic C=C), 1458 (—CH3), 1312 (aromatic C=N), 1202 (C=S), 761 (aromatic C—Cl).

N-(3-chlorophenyl)-3-methyl-5-phenyl-1H-pyrazole-1-carbothioamide (Compound SB76)

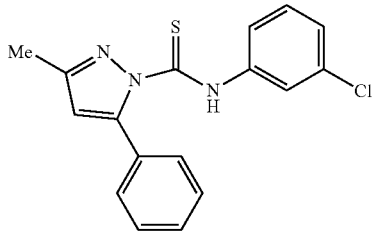

¹H NMR (600 MHZ, DMSO-d$_6$) δ 12.55 (s, 1H), 8.00-7.13 (m, 9H), 6.44 (s, 1H), 2.25 (s, 3H). ¹³CNMR (101 MHz, DMSO-d$_6$) δ 162.79, 141.52, 133.68, 131.02, 130.89, 129.08, 127.71, 125.41, 122.13, 118.12, 117.21, 116.69, 115.87, 36.25, 31.23. FTIR, cm$^{-1}$: 3059 (—NH), 2852 (C—H aromatic), 1661 (aromatic C=C), 1458 (—CH3), 1311 (aromatic C=N), 1292 (C=S), 761 (aromatic C—Cl).

N-(4-methoxyphenyl)-1H-pyrazole-1-carbothioamide (Compound SB22)

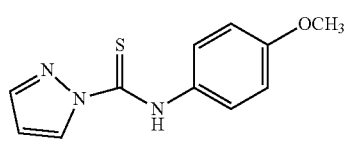 [SMILES: COc1ccc(NC(=S)n2cccn2)cc1]

¹H NMR (400 MHZ, DMSO-d$_6$) δ 8.76 (s, 1H), 7.45 (s, 1H), 7.05 (d, J=8.0 Hz, 2H), 6.78 (d, J=8.8 Hz, 2H), 6.22 (s, 1H), 3.70 (m, 3H). ¹³C FTIR, cm$^{-1}$: 3272 (—NH—), 3125 (C—H aromatic), 2840 (C—H), 1651 (aromatic C=C), 1490 (aromatic C=N), 1250 (C=S), 1234 (C—O). Binding constant (M$^{-1}$): 3975. MIC (μM): 10.

Compound SB23

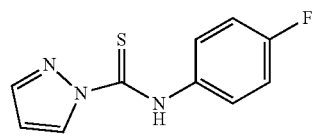 [SMILES: Fc1ccc(NC(=S)n2cccn2)cc1]

Binding constant (M$^{-1}$): 22057. MIC (μM): >10.

N-(p-tolyl)-1H-pyrazole-1-carbothioamide (Compound SB25)

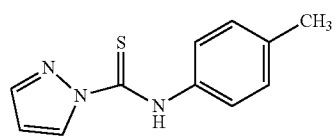

¹H NMR (600 MHZ, DMSO-d$_6$) δ 8.75 (d, J=2.8 Hz, 1H), 7.97 (d, J=1.6 Hz, 1H), 7.50 (m, 2H), 7.25 (m, 2H), 6.63 (dd, J=2.8, 1.7 Hz, 1H), 2.33 (s, 3H). ¹³C NMR (151 MHZ, DMSO-d$_6$) δ 174.62, 143.66, 132.32, 130.81, 129.42, 125.91, 110.32, 104.67, 21.17. FTIR, cm$^{-1}$: 3277 (—NH—), 3119 (C—H aromatic), 2914 (aliphatic C—H), 1658 (aromatic C=C), 1584 (aromatic C=N), 1240 (C=S), 1516 (C=C—C).

N-(4-bromophenyl)-1H-pyrazole-1-carbothioamide (Compound SB26)

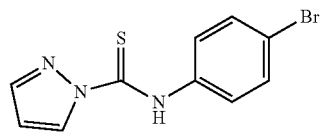 [SMILES: S=C(Nc1ccc(Br)cc1)n1cccn1]

¹H NMR (400 MHZ, DMSO-d$_6$) δ 8.73 (d, 1H), 7.93 (d, J=14.6 Hz, 1H), 7.71-7.48 (m, 2H) Overlapped, 7.40 (d, 2H), 6.59 (d, 1H). ¹³C NMR (101 MHz, DMSO-d$_6$) δ 170.15, 143.69, 133.50, 131.99, 128.70, 121.33, 110.26, 104.87. FTIR, cm$^{-1}$: 3263 (—NH—), 3152 (C—H aromatic), 1630 (aromatic C=C), 1584 (aromatic C=N), 12360 (C=S), 668 (aromatic C=Br).

Synthesis Route G:

2-amino-N-(1-((4-chlorophenyl) carbamothioyl)-1H-pyrazol-3-yl) acetamide (Compound SB84)

To an RBF was added carbonyldiimidazole (29.7 mg, 0.396 mmol) and dimethylformamide (3 mL). This solution was allowed to stir at room temperature and glycine was added slowly. Following completion of this addition, the reaction was left to stir at room temperature for 50 minutes. This was then heated to 60° C. and left to reflux for 2 hours. The solvent was then removed in vacuo and ice water added to the residue. A pink-colored solid precipitated, which was then collected via filtration. $^1$H NMR (400 MHZ, DMSO-$d_6$) δ 12.70 (s, 1H), 10.81 (s, 1H), 7.75 (s, 1H), 7.68 (s, 2H), 7.42 (s, 2H), 7.05 (s, 1H), 6.05 (s, 2H). $^{13}$C NMR (101 MHZ, Deuterium Oxide) δ 149.71, 130.21, 128.94, 128.85, 126.29, 94.89, 40.53, 40.32, 40.11, 39.90, 39.70, 39.49, 39.28. FTIR, cm$^{-1}$: 3365 (—NH$_2$), 3179, 3045 (—NH), 1575 (C=O), 1527 (aromatic C=C), 1269 (aromatic C=N), 1205 (C=S), 755 (aromatic C—Cl).

K$_2$O Peptide Bound to Two APM03 NNSN Molecules (Compound SB85)

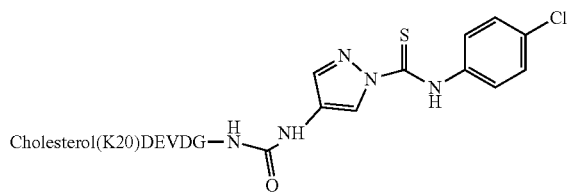

$^1$H NMR (400 MHz, DMSO-$d_6$) δ 8.03 (d, J=14.5 Hz, 2H), 7.96 (s, 3H), 2.90 (s, 8H), 1.10 (t, J=7.0 Hz, 2H), 0.86 (s, 1H). $^{13}$C NMR (101 MHz, DMSO-$d_6$) δ 171.94, 162.79, 128.61, 121.55, 39.12, 37.44, 36.26, 31.23, 31.07, 27.08, 22.71, 19.72. FTIR, cm$^{-1}$: 3250, 3013, 2905 (—NH), 1675 (C=O), 1500 (C=S), 1109 (aromatic C=N), 811 (aromatic C—Cl).

3,3'-(((((2-aminoethyl)azanediyl)bis(ethane-2,1-diyl))bis(azanediyl))bis(carbonothioyl))bis(azanediyl))bis(N-(4-chlorophenyl)-1H-pyrazole-1-carbothioamide) (Compound SB86)

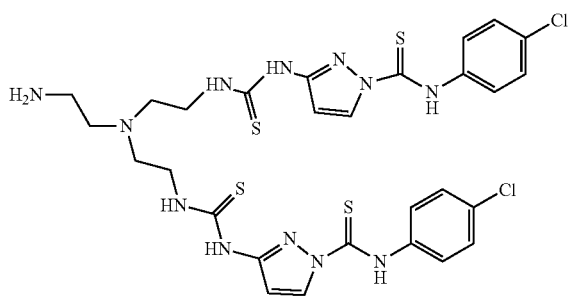 [SMILES: NCCN(CCNC(=S)Nc1ccn(C(=S)Nc2ccc(Cl)cc2)n1)CCNC(=S)Nc1ccn(C(=S)Nc2ccc(Cl)cc2)n1]

$^1$H NMR (400 MHZ, DMSO-$d_6$) δ 9.68 (s, 2H), 7.64 (s, 2H), 7.45 (s, 4H), 7.35 (s, 4H), 6.57-6.52 (m, 2H). $^{13}$C NMR (101 MHz, DMSO-$d_6$) δ 161.69, 135.62, 128.95, 115.62, 53.47, 42.31, 36.26, 35.96. FTIR, cm$^{-1}$: 3282, 3050, 2933, (—NH), 1647 (C—O), 1419 (C=S), 1173 (aromatic C=N), 719 (aromatic C—C).

Figure 2:
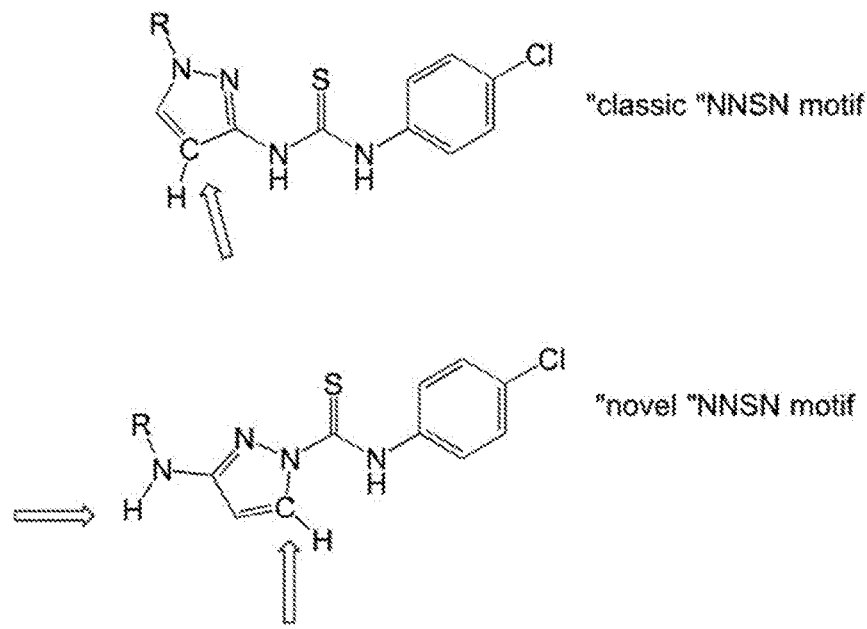
FIG. 2 depicts preferred binding sites of Cu(I) (added as CuBr) to compounds with NNSN motif in CD4OD.

Summary of NMR Experiments $^1$H-NMR shifts (400 MHz Varian) revealed distinct sites at which Cu(I) is bound. They were recorded in D4-methanol by means of adding aliquots of a 5 mmol CuBr stock solution in D4-methanol to the 1 mmol NNSN-compound, resulting in 0, 0.5, 1.0, 2.0 and 3.0 mmol CuBr concentration in D4-methanol. The resulting preferred sites of binding are marked by arrows in FIG. 2. With this approach, both the heterocycle and aromatic substituents are easily tunable. Synthesized compounds showing promising activity are listed in the table below.

TABLE I

| Code Name | Chemical Structure | Molecular Weight | MIC* against MRSA (μM) | Therapeutic index (approx.) | Copper (I) binding constant (M$^{-1}$) |
|---|---|---|---|---|---|
| APM03 | | C$_{10}$H$_9$ClN$_4$S<br>Exact Mass: 252.02<br>Mol. Wt.: 252.72 | 0.07 | 2 | 53225 |
| SB19 | | C$_{10}$H$_8$ClN$_3$S<br>Exact Mass: 237.01<br>Mol. Wt.: 237.71 | 5.0 | | 2100 |
| SB22 | | C$_{11}$H$_{11}$N$_3$OS<br>Exact Mass: 233.06<br>Mol. Wt.: 233.29 | 10 | >2 | 3975 |

TABLE I-continued

| Code Name | Chemical Structure | Molecular Weight | MIC* against MRSA (μM) | Therapeutic index (approx.) | Copper (I) binding constant (M⁻¹) |
|---|---|---|---|---|---|
| SB25 | | $C_{11}H_{11}N_3S$<br>Exact Mass: 217.07<br>Mol. Wt.: 217.29 | 5 | | 1635 |
| SB26 | | $C_{10}H_8BrN_3S$<br>Exact Mass: 280.96<br>Mol. Wt.: 282.16 | 10 | | 1550 |
| SB27 | | $C_{10}H_9N_5O_2S$<br>Exact Mass: 263.05<br>Mol. Wt.: 263.28 | 0.3 | 1 | 10460 |
| SB31 | | $C_{11}H_{12}N_4OS$<br>Exact Mass: 248.07<br>Mol. Wt.: 248.3 | 10 | | 5452 |
| SB32 | | $C_{11}H_{12}N_4S$<br>Exact Mass: 232.08<br>Mol. Wt.: 232.3 | 2.5 | | 6140 |
| SB33 | | $C_{10}H_9BrN_4S$<br>Exact Mass: 295.97<br>Mol. Wt.: 297.17 | 1.25 | | 5830 |
| SB37 | | $C_{10}H_9FN_4S$<br>Exact Mass: 236.05<br>Mol. Wt.: 236.27 | 10 | | 5540 |
| SB40 | | $C_{12}H_{13}ClN_4S$<br>Exact Mass: 280.05<br>Mol. Wt.: 280.78 | 0.6 | | 58500 |
| SB45 | | $C_{18}H_{14}Cl_2N_4S_2$<br>Exact Mass: 420.00<br>Mol. Wt.: 421.36 | <0.016 | | |

TABLE I-continued

| Code Name | Chemical Structure | Molecular Weight | MIC* against MRSA (μM) | Therapeutic index (approx.) | Copper (I) binding constant (M$^{-1}$) |
|---|---|---|---|---|---|
| SB44 | | C$_{17}$H$_{14}$ClN$_3$OS<br>Exact Mass: 343.05<br>Mol. Wt.: 343.83 | 0.15 | | |
| SB46 | | C$_{10}$H$_8$ClN$_3$S<br>Exact Mass: 237.01<br>Mol. Wt.: 237.71 | 0.3 | | |
| SB47 | | C$_{11}$H$_9$ClN$_4$O$_2$S<br>Exact Mass: 296.01<br>Mol. Wt.: 296.73 | 2.5 | | |
| SB49 | | C$_{10}$H$_9$ClN$_4$S<br>Exact Mass: 252.02<br>Mol. Wt.: 252.72 | 0.6 | | |
| SB50 | | C$_{10}$H$_9$ClN$_4$S<br>Exact Mass: 252.02<br>Mol. Wt.: 252.72 | 0.15 | | |
| SB52 | | C$_{10}$H$_8$ClN$_3$S<br>Exact Mass: 237.01<br>Mol. Wt.: 237.71 | 2.5 | | |
| SB53 | | C$_{17}$H$_{13}$Cl$_2$N$_5$S$_2$<br>Exact Mass: 421.00<br>Mol. Wt.: 422.35 | 0.3 | | |
| SB73 | | C$_{12}$H$_{10}$ClN$_3$O$_2$S<br>Exact Mass: 295.02<br>Mol. Wt.: 295.74 | 5 | | 985.27 |

TABLE I-continued

| Code Name | Chemical Structure | Molecular Weight | MIC* against MRSA (μM) | Therapeutic index (approx.) | Copper (I) binding constant (M$^{-1}$) |
|---|---|---|---|---|---|
| SB74 | | $C_{12}H_{10}ClN_3O_2S$<br>Exact Mass: 295.02<br>Mol. Wt.: 295.74 | 2.5 | | 1127.86 |
| SB77 | | $C_{13}H_{12}ClN_3O_2S$<br>Exact Mass: 309.03<br>Mol. Wt.: 309.77 | 0.6 | | 1580.08 |

*Data here is kinetic data (determined from bacteria growth experiments), resulting in IC$_{50}$ values similar to MIC values.

Example 2

In Vitro Activity Against *S. aureus*

*S. aureus* is found on human skin and mucous membranes. Resistant versions of the organism present various health challenges ranging from minor skin infections to life threatening pneumonia. During the past decades, much attention has been shown to the synthesis of new organometal complexes and the evaluation of these agents for antibacterial activity. It has been found that thiosemicarbazones represent a new promising class of antibiotics. Work described herein demonstrates that novel compounds with the core motif (NNSN), show better antibacterial properties against MRSA in the presence of Cu(I) ions, even in nanomolar concentrations. Although the concentration of free copper ions is extremely rare in mammalian bodies, it is significantly enhanced in phagosomes (vesicles formed around phagocytosed bacteria), which accelerates the formation of Cu(I)-NNSN complexes inside (but not outside) the phagosome. Consequently, a significant targeting effect is observed, for which the cellular response to bacterial infections (often called nutritional immunity) is responsible.

Figure 3:
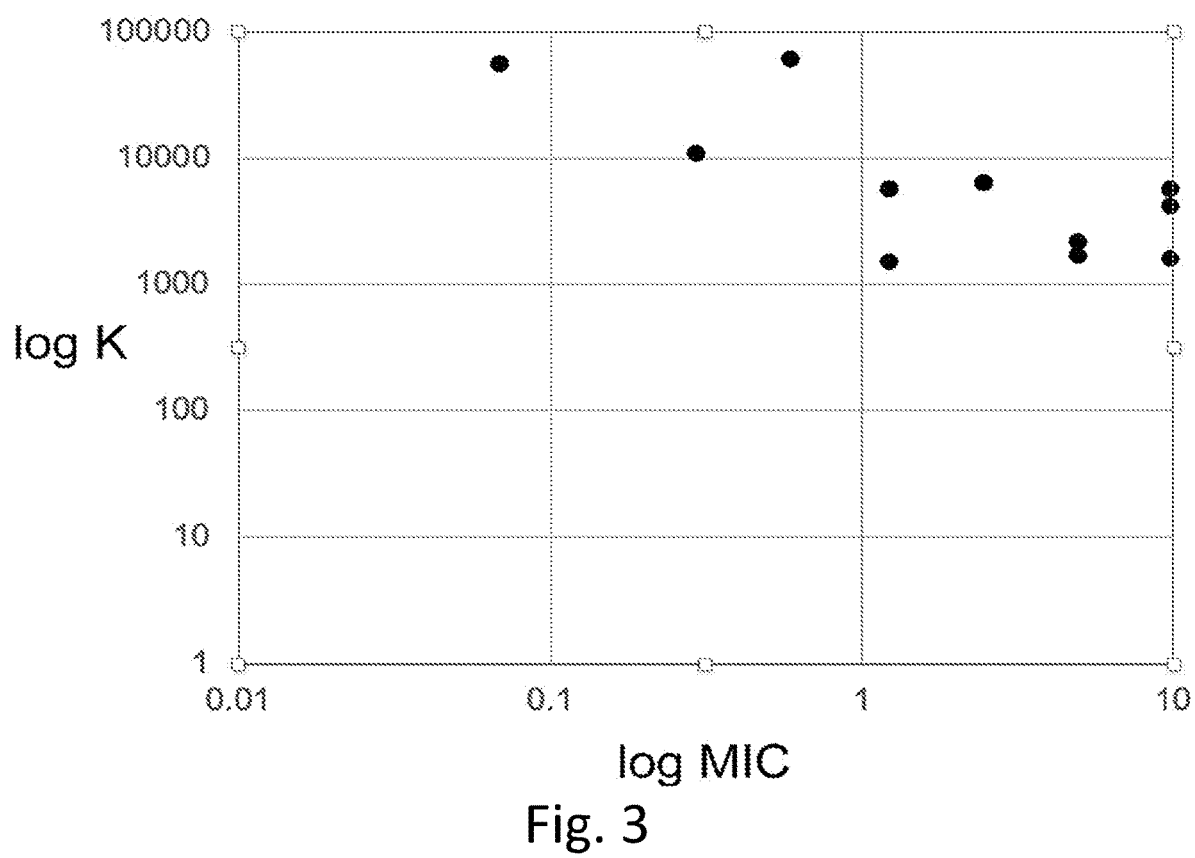
FIG. 3 is a graph of log K (binding constant Cu—NNSN compound (1:1 stoichiometry) vs. log MIC (minimal inhibitory concentration, micromolar) from Example 2.
Figure 4:
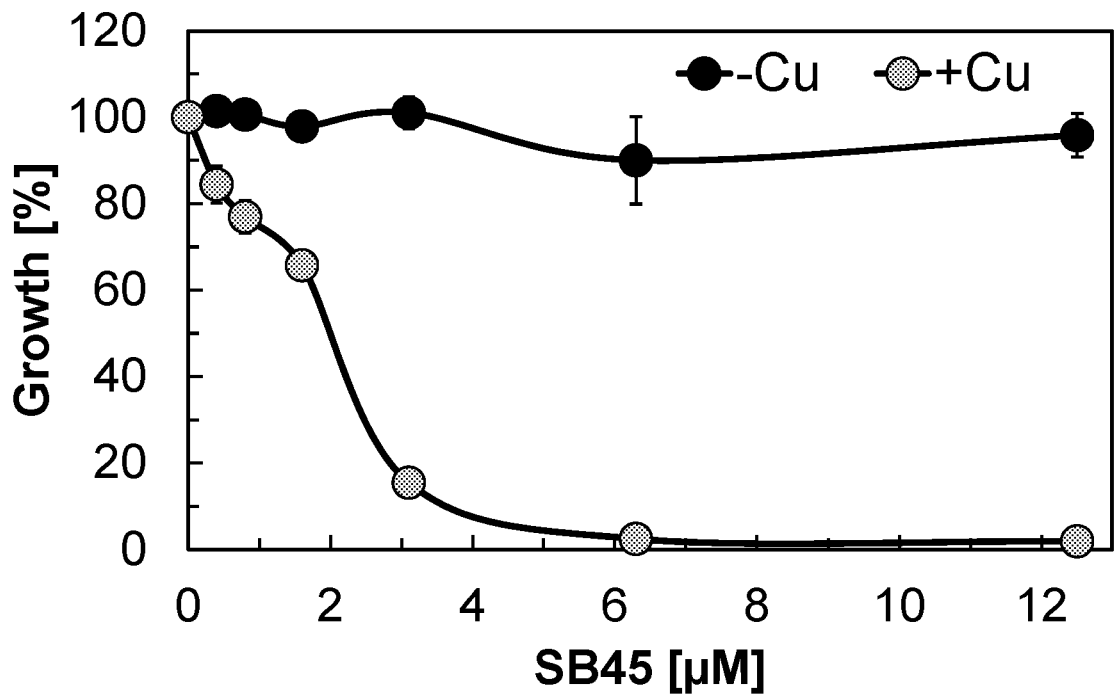
FIG. 4 is a graph of the in vitro activity of SB45 against M. tuberculosis in the presence (+Cu) or absence (−Cu) of copper from Example 4.
Figure 5:
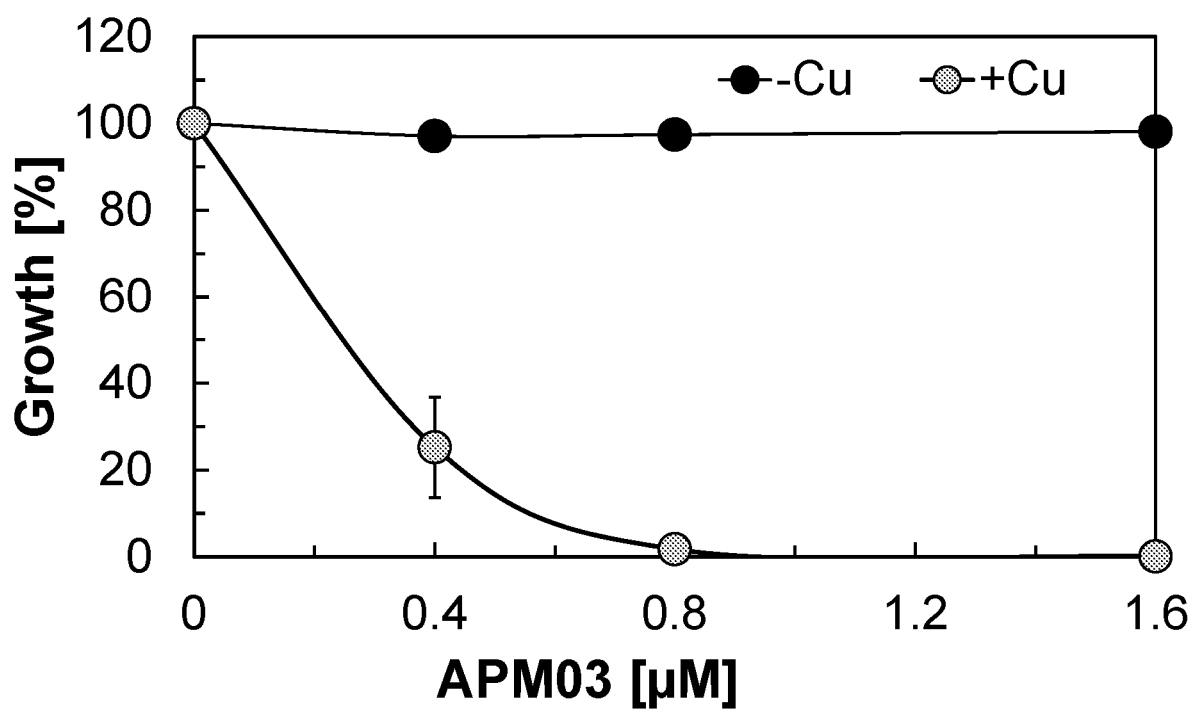
FIG. 5 is a graph of the in vitro activity of APM03 against M. tuberculosis in the presence (+Cu) or absence (−Cu) of copper from Example 4.
Figure 6:
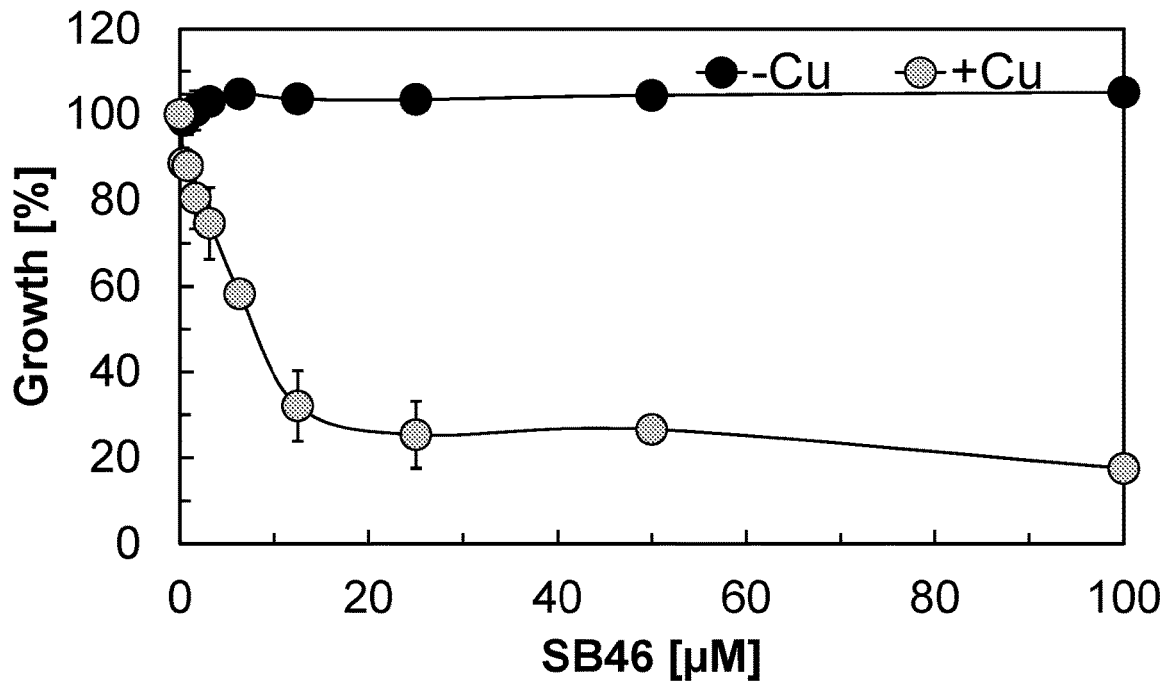
FIG. 6 is a graph of the in vitro activity of SB46 against M. tuberculosis in the presence (+Cu) or absence (−Cu) of copper from Example 4.
Figure 7:
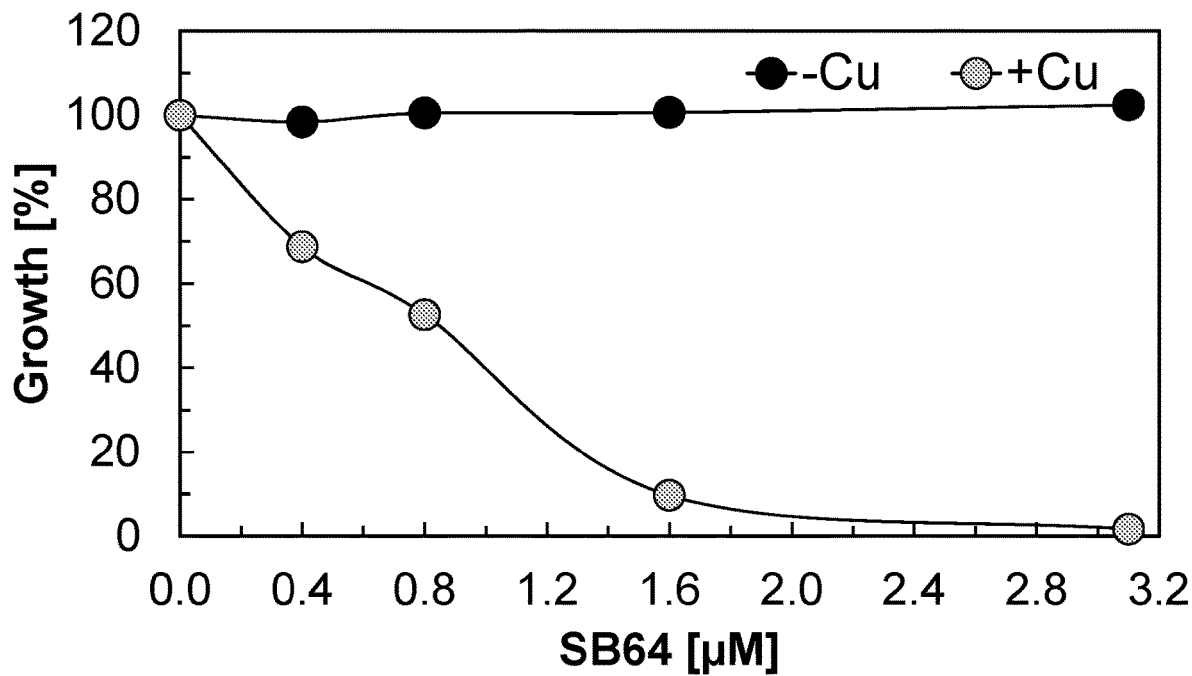
FIG. 7 is a graph of the in vitro activity of SB64 against M. tuberculosis in the presence (+Cu) or absence (−Cu) of copper from Example 4.
Figure 8:
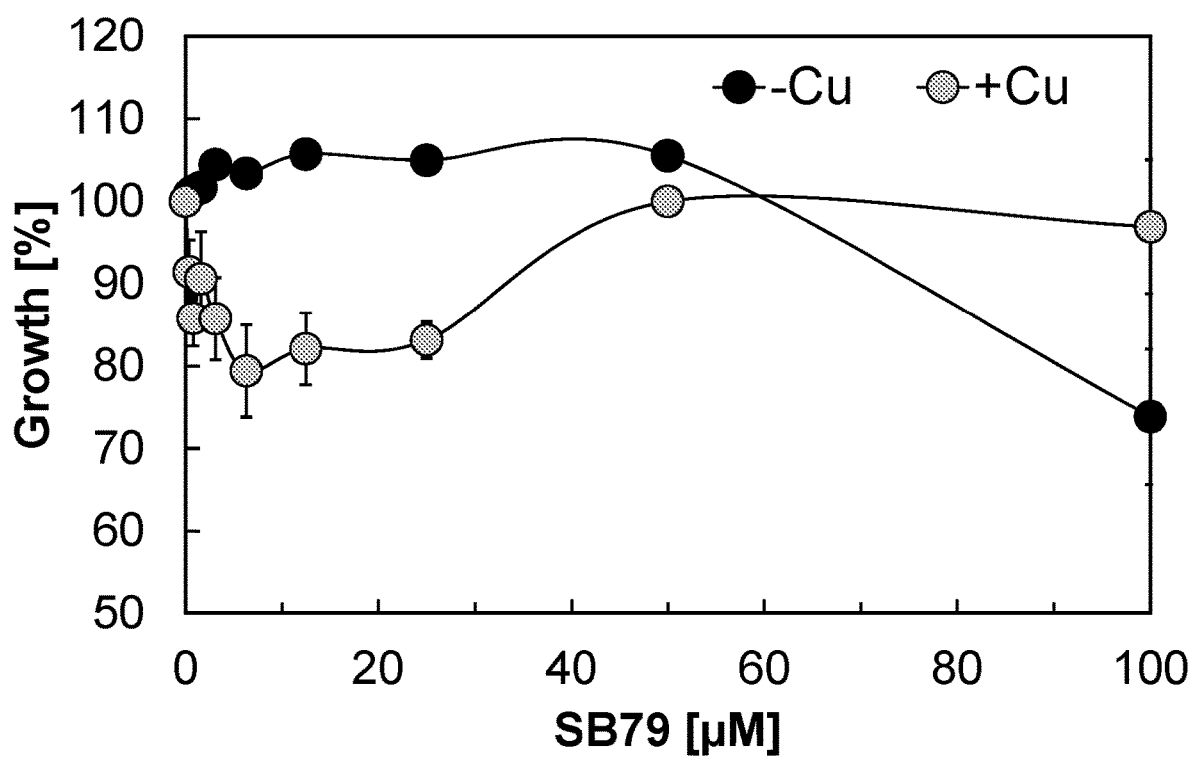
FIG. 8 is a graph of the in vitro activity of SB79 against M. tuberculosis in the presence (+Cu) or absence (−Cu) of copper from Example 4.

*S. aureus* was inoculated in Mueller-Hinton medium from frozen stocks and grown for 2-4 h (until reaching an OD600~1) at 37° C. while shaking. Once the OD was reached, bacteria were harvested and diluted in Phenolred-free RPMI1640 medium to an OD of 0.01 (=inoculum). Test compounds where diluted from frozen DMSO-stocks were diluted in Phenolred-free RPMI1640 medium with or without Cu supplementation (100 μM) and serially diluted in 96-well plates in the same medium to achieve a final concentration of between 0.08 and 10 μM after addition of an equal volume of inoculum. Medium-only controls and growth controls in the absence of test compounds were also included. The plates were placed in sealed bags and incubated at 37° C. After 15-20 h incubation time, an OD600 reading was taken and analyzed. The minimal inhibitory concentration (MIC) is defined as the lowest concentration of test compound with less than 10% growth relative to the no-compound control (aka, 90% inhibitory concentration, MIC90). If kinetic data were required, resazurin was added to each well. Using a plate reader with incubation chamber, resazurin conversion was monitored by fluorescence reading every 20 min for up to 24 h. After normalizing the data to respective controls, the MIC was determined using the same definition as above. The results are shown in FIG. 3.

Example 3

Zinc-Activated Activity

AMP03 and SB17 were tested against bacterial infection in vitro using Zn$^{2+}$ as the trigger instead of copper, following a similar protocol to Example 2. Zinc was able to effectively trigger the compounds: AMP03 had an MIC of 2.5 μM and SB17 had an MIC of 5.0 μM. Briefly, *S. aureus* clinical isolate SA3 (resistant to ampillicin, clindamycin, erythromycin, penicillin, and tetracycline) was obtained from University of Alabama Laboratory Medicine. Bacteria were grown in Mueller-Hinton medium (MH) (Oxoid Ltd., Basingstoke, Hampshire, England) overnight at 37° C. before plates were inoculated. All experiments were performed in 96-well plates using MH medium supplemented with zinc sulfate (ranging from 0 to 100 micromoles).

High throughput screening assay: HTS assays were conducted in a 96-well plate reader (Synergy, BioTek). *S. aureus* was added to each well to achieve final optical density (OD600) of 0.001 to 0.004 (1:1000 dilution of an overnight culture) in a total volume of 160 ml. All steps were performed using the Precision Power automated microplate pipetting system (BioTek). Plates were sealed with parafilm (Millipore) to minimize evaporation and incubated on a Heidolph Titramax 1000 plate shaker at 450 rpm at 37° C. for 8 hours. Optical density, as a quantitative surrogate marker of bacterial growth, was determined using the Synergy plate reader. Background correction was performed against wells containing only medium. From the wells with stopped or retarded growth, minimum inhibitory concentrations of zinc(II) were identified.

Example 4

Copper-Activated Activity Against *M. tuberculosis*

Growth assays were conducted using several test compounds for activity against cultures of *Mycobacterium tuberculosis*. Avirulent Mtb strain mc26206 (H37Rv ΔpanCD ΔleuCD, double auxotroph) was grown in Copper free 7H9 liquid medium, supplemented with 0.2% Casamino Acids, 10% ADS (Albumin, Dextrose, Salt), 0.02% Tyloxapol, 24 μg/ml D-Pantothenate, and 50 μg/ml L-Leucine. For +Cu experiments, 50 micromoles per liter of CuSO4×7H2O was included in the assay. The results were determined using an Alamar blue assay: Ex-530 nm, Em-590 nm. Compound APM03 is considered the standard/reference control compound. The results are shown in the table below and FIGS. 4-8.

| Test compound | | −Cu | +Cu |
|---|---|---|---|
| APM03 | IC50 | >12.5 μM | 0.3 μM |
| | MIC90 | >25 μM | 0.5 μM |
| SB45 | IC50 | >50 μM | 2 μM |
| | MIC90 | >100 μM | 3.5 μM |
| SB46 | IC50 | >100 μM | 10 μM |
| | MIC90 | >100 μM | >100 μM |
| SB64 | IC50 | >100 μM | 0.8 μM |
| | MIC90 | >100 μM | 1.6 μM |
| SB79 | IC50 | >100 μM | >100 μM |
| | MIC90 | >100 μM | >100 μM |

Example 5

In Vitro Activity Against *S. aureus*

Compounds SB54-SB62 were tested against *S. aureus* strain 1471. For the drop assay, bacteria were grown in wells with or without copper, using a 1:2 drug titration starting at 10 μM.

| Compounds | GTSM | APM03 | SB54 | SB55 | SB56 | SB57 | SB58 | SB59 | SB60 | SB61 | SB62 |
|---|---|---|---|---|---|---|---|---|---|---|---|
| MIC: No Metal | — | — | — | — | — | — | — | — | — | — | — |
| MIC: +50 μM Cu | 0.3 | 1.25 | 0.15 | 10 | 5 | 0.6 | — | 2.5 | 1.25 | — | 5 |

Discussion

Copper-activated drugs against Methicillin-resistant *S. aureus* (MRSA) and, potentially, other multi-resistant pathogens, increase significantly in their efficacy when forming copper(I) complexes, resulting in high therapeutic indexes. They utilize copper(I), which is provided as a cellular response to bacterial infections within phagosomes (bacteria engulfing endosomes). This strategy is part of the "nutritional immunity response", in which the host cells attempt to sequester vital nutrients of the invading pathogens, while increasing the concentration of toxic copper(I) and zinc(II). This is virtually the only part of the human body where "free" copper(I) in significant concentrations can be found. We have identified a novel type of thiourea compounds with NNSN-motif. Upon complexation, an iminium cation is formed, which is a well-known reactive intermediate in numerous org. reactions. This includes a plethora of radical reactions. It is our paradigm that this reactive group is capable of acting as a warhead. Iminium warheads react with multiple targets within the bacterium, making a genetic adaptation much harder than drugs designed for a single target. The concentration of copper(I) within bacteria-activated phagosomes varies from 50 to 500 μM. Therefore, the binding constant of copper-activatable compounds with NNSN motif should be within the interval of 50,000 to 2,500 l mol$^{-1}$ (1:1 stoichiometry of the Cu(I)-NNSN complexes assumed). To cover all possible compounds, we should extent the ration probably to 100,000 to 1,000 l mol$^{-1}$. If the copper(I)-binding constant is higher, the NNSN compound can compete with copper-storage proteins anywhere in the body, causing unacceptable systemic toxicity. If the copper (I)-binding constant is lower, it cannot be activated in a phagosome anymore.

Initial lead compound, used as reference Compound: APM03 (log P=2.1) (log P=octanol/water partition coefficient), which has an MIC against MRSA (clinical isolate 1471) of 0.6 μM. APM03 also has a lower MIC (0.07 mM) against the clinical isolate SA3 (resistant to ampicillin, clindamycin, erythromycin, penicillin, and tetracycline). Further, it had the best IC50 against Avirulent Mtb strain mc$^2$6206 (H37Rv ΔpanCD ΔleuCD, double auxotroph), making it the most effective compound against *M. tuberculosis*. However, because the compound is relatively hydrophilic, AMP03 will be quickly cleared from circulation via renal excretion. Therefore, SB44 is our lead compound for IV treatment, particularly for treatment of multi-drug resistant Gram-positive infections, with an MIC against MRSA (clinical isolate 1471) of 0.15 μM. SB44 has a log P=4.74 (close to 5.0) and a molecular weight of 343.8 g/mol. According to the Lipinski rule, these are ideal biophysical properties for intravenous drug delivery. Another lead compound against Gram-positive Bacteria is SB54 with an MIC against MRSA (clinical isolate 1471) of 0.15 μM. SB54 has a log P=5.9, however, which is too hydrophobic for IV delivery. Although it can be topically applied to Gram-positive infections.

The invention claimed is:

1. A copper(I)- or zinc(II)-activated compound of formula I or formula II:

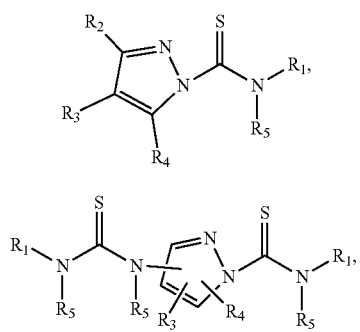

or a pharmaceutically-acceptable salt thereof, where:

$R_1$ is a substituted aryl; and $R_2$ is a branched or unbranched alkyl or alkenyl that may be substituted, or $R_2$ is a substituted or unsubstituted amine, a substituted or unsubstituted amide, an ether, a thioether, an ester, a carboxylic acid, a substituted or unsubstituted aryl, a thiourea group, or a benzyloxy group; and $R_3$ is hydrogen, a halogen, a branched or unbranched alkyl or alkenyl, a cycloalkyl, a heterocycle, an ether, a thioether, an ester, an amine, an amide, a hydrazine, a hydrazone, or a nitro group; and $R_4$ is hydrogen, a halogen, a branched or unbranched alkyl or alkenyl, a cycloalkyl, a heterocycle, an ether, a thioether, an ester, an amine, an amide, a hydrazine, a hydrazone, or a nitro group; and $R_5$ is hydrogen or a branched or unbranched alkyl or alkenyl that may be substituted.

2. The compound of claim 1, wherein said compound inhibits activity of mycobacteria, Gram-negative bacteria, and/or Gram-positive bacteria in the presence of copper(I) or zinc(II).

3. The compound of claim 1, wherein said compound inhibits activity of an antibiotic-resistant bacteria in the presence of copper(I) or zinc(II).

4. The compound of claim 1, wherein said compound has an MIC of less than 10 μM.

5. The compound of claim 1, wherein said compound has an MIC of less than 1 μM.

6. The compound of claim 1, wherein each of said branched or unbranched alkyls or alkenyls may be halogen-, sulfonic acid-, or nitro-substituted.

7. The compound of claim 1, wherein each of said aryls may be substituted by one or more halogens, nitro groups, alkoxies, or alkyls.

8. The compound of claim 1, wherein said compound is formula (I), and $R_1$ is a halogen-substituted aryl, $R_2$ is primary amine, and each of $R_3$, $R_4$, and $R_5$ are hydrogen.

9. The compound of claim 8, wherein $R_1$ is a halogen-substituted phenyl or benzyl group, and $R_2$ is a primary amine group.

10. The compound of claim 1, wherein said compound is formula (II), each $R_1$ is a halogen-substituted aryl, each of $R_3$ and $R_4$ are hydrogen, and each $R_5$ is hydrogen or an alkyl.

11. The compound of claim 10, wherein $R_1$ is a halogen-substituted phenyl or benzyl group.

12. The compound of claim 1, wherein said compound is selected from the group consisting of 3-amino-N-(4-chlorophenyl)-1H-pyrazole-1-carbothioamide, 3-amino-N-(4-nitrophenyl)-1H-pyrazole-1-carbothioamide, 3-amino-N-(4-methoxyphenyl)-1H-pyrazole-1-carbothioamide, 3-amino-N-(p-tolyl)-1H-pyrazole-1-carbothioamide, 3-amino-N-(4-bromophenyl)-1H-pyrazole-1-carbothioamide, 3-amino-N-(4-fluorophenyl)-1H-pyrazole-1-carbothioamide, N-(4-chlorophenyl)-3-(dimethylamino)-1H-pyrazole-1-carbothioamide, N-(4-chlorophenyl)-3-(3-(4-chlorophenyl)-1-methylthioureido)-1H-pyrazole-1-carbothioamide, 3-(benzyloxy)-N-(4-chlorophenyl)-1H-pyrazole-1-carbothioamide, N-(4-chlorophenyl)-3-methyl-4-nitro-1H-pyrazole-1-carbothioamide, 3-amino-N-(2-chlorophenyl)-1H-pyrazole-1-carbothioamide, 3-amino-N-(3-chlorophenyl)-1H-pyrazole-1-carbothioamide, N-(2-chlorophenyl)-3-(3-(2-chlorophenyl)thioureido)-1H-pyrazole-1-carbothioamide, Ethyl 1-((2-chlorophenyl) carbamothioyl)-1H-pyrazole-3-carboxylate, Ethyl 1-((3-chlorophenyl) carbamothioyl)-1H-pyrazole-3-carboxylate, and Ethyl 1-((4-chlorophenyl) carbamothioyl)-1H-pyrazole-3-carboxylate.

13. The compound of claim 1, wherein said compound is selected from the group consisting of

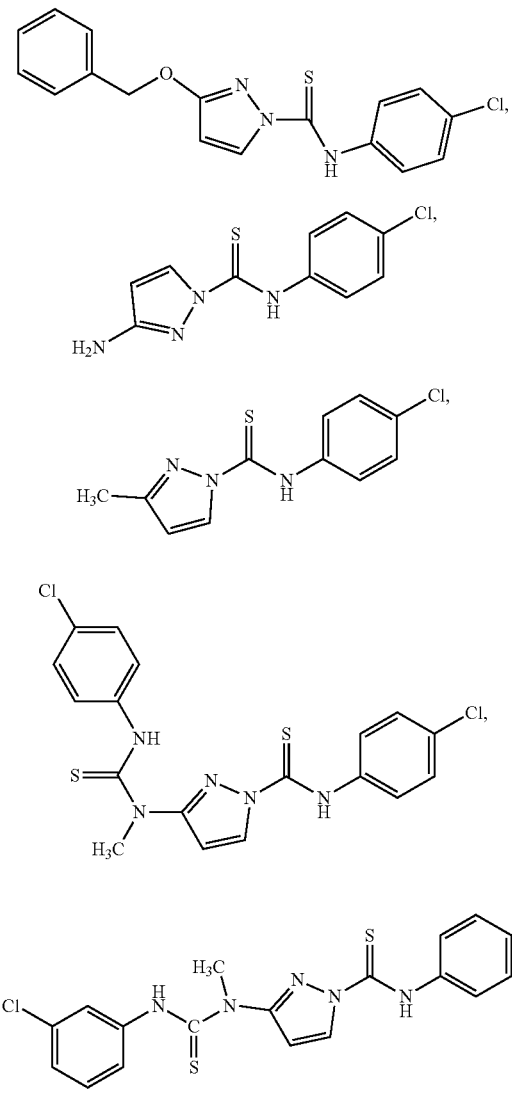

and a pharmaceutically-acceptable salt thereof.

14. A method of inhibiting bacterial infection in a subject, said method comprising administering a therapeutically-effective amount of a copper(I)- or zinc(II)-activated compound according to claim 1 to said subject, wherein said compound reacts with endogenous copper(I) and/or zinc(II) in said subject at a site of bacterial infection to yield a copper and/or zinc analog of an iminium cation active against said bacterial infection.

15. The method of claim 14, wherein said compound is administered intramuscularly, subcutaneously, intradermally, intranasally, intravenously, orally, or topically.

16. The method of claim 14, wherein said compound is dispersed in a pharmaceutically-acceptable carrier.

17. The method of claim 16, comprising a plurality of said compounds dispersed in said carrier.

18. The method of claim 17, comprising a plurality of different compounds.

19. The method of claim 14, further comprising providing a unit dosage form of said compound dispersed in a pharmaceutically-acceptable carrier prior to said administering.

20. The method of claim 14, wherein said subject is a human or a non-human animal.

21. The method of claim 14, wherein said bacterial infection is caused by a microorganism selected from the group consisting of *Mycobacterium tuberculosis*, *Escherichia coli*, *Staphylococcus aureus*, *Staphylococcus epidermidis*, *Staphylococcus haemolyticus*, *Enterococcus faecalis*, *Streptococcus pneumoniae*, *Streptococcus pyogenes*, *Streptococcus mitis*, *Streptococcus mutans*, *Streptococcus bovis*, Group B *Streptococcus*, *Listeria monocytogenes*, *Cutibacterium acnes*, *Chlamydia trachomatis*, *Klebsiella pneumoniae*, *Pseudomonas aeruginosa*, *Enterococcus faecium*, *Salmonella typhimurium*, *Bacillus subtilis*, *Neisseria meningitides*, *Neisseria gonorrhoeae*, *Haemophilus influenzae*, *Acinetobacter baumannii*, and *Mycoplasma* spp.

22. The method of claim 14, wherein said bacterial infection is caused by a resistant bacteria selected from the group consisting of Vancomycin-resistant *Enterococcus faecium* (VRE), Methicillin-resistant *Staphylococcus aureus* (MRSA), and Fluoroquinolone-resistant *Pseudomonas aeruginosa*.

23. The method of claim 14, wherein said compound is co-administered with a conventional antibiotic.

24. A composition comprising a copper(I)- or zinc(II)-activated compound according to claim 1 dispersed in a pharmaceutically-acceptable carrier.

25. The composition of claim 24, wherein said carrier is selected from the group consisting of sterile isotonic aqueous buffer, normal saline, phosphate buffered saline, DMSO, sterile water, oil-in-water emulsion, water-in-oil emulsion, petrolatum, paraffin, glycerins, mineral oil, propylene glycol, polyethylene glycol, stearic acid, parabens, vegetable oils, seed/nut oils, and mixtures thereof.

26. A method of inhibiting replication of bacteria in a cell, said method comprising contacting the cell with a copper(I)- or zinc(II)-activated compound according to claim 1 or pharmaceutical composition thereof, wherein the bacteria is selected from mycobacteria, Gram-negative bacteria, and/or Gram-positive bacteria.

* * * * *

SEQUENCE LISTING

<160> NUMBER OF SEQ ID NOS: 3

<210> SEQ ID NO 1
<211> LENGTH: 19
<212> TYPE: PRT
<213> ORGANISM: Artificial Sequence
<220> FEATURE:
<223> OTHER INFORMATION: Synthetic peptide

<400> SEQUENCE: 1

Arg Pro Asp Lys Pro Arg Pro Tyr Leu Pro Arg Pro Arg Pro Pro Arg
1               5                   10                  15

Pro Val Arg

```
<210> SEQ ID NO 2
<211> LENGTH: 23
<212> TYPE: PRT
<213> ORGANISM: Artificial Sequence
<220> FEATURE:
<223> OTHER INFORMATION: Synthetic peptide

<400> SEQUENCE: 2

Gly Leu Lys Asp Ile Phe Lys Ala Gly Leu Gly Ser Leu Val Lys Gly
1               5                   10                  15

Ile Ala Ala His Val Ala Asn
            20

<210> SEQ ID NO 3
<211> LENGTH: 4
<212> TYPE: PRT
<213> ORGANISM: Artificial Sequence
<220> FEATURE:
<223> OTHER INFORMATION: Synthetic peptide

<400> SEQUENCE: 3

Thr Gly Pro Arg
1
```